(12) United States Patent
Huang et al.

(10) Patent No.: US 11,683,694 B2
(45) Date of Patent: *Jun. 20, 2023

(54) ACCESS POINT (AP) MULTI-LINK DEVICE (MLD) CONFIGURED FOR MULTI-LINK OPERATION (MLO)

(71) Applicant: Intel Corporation, Santa Clara, CA (US)

(72) Inventors: Po-Kai Huang, San Jose, CA (US); Daniel Leiderman, Ra'anana (IL); Arik Klein, Givaat Shmuel (IL); Laurent Cariou, Portland, OR (US); Daniel F. Bravo, Hillsboro, OR (US); Feng Jiang, Sunnyvale, CA (US); Qinghua Li, San Ramon, CA (US); Xiaogang Chen, Hillsboro, OR (US); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 17/360,318

(22) Filed: Jun. 28, 2021

(65) Prior Publication Data

US 2021/0409958 A1    Dec. 30, 2021

Related U.S. Application Data

(63) Continuation of application No. 16/543,157, filed on Aug. 16, 2019, now Pat. No. 11,051,174.
(Continued)

(51) Int. Cl.
*H04W 16/10* (2009.01)
*H04W 4/06* (2009.01)
(Continued)

(52) U.S. Cl.
CPC ......... *H04W 16/10* (2013.01); *H04L 25/0224* (2013.01); *H04W 4/06* (2013.01);
(Continued)

(58) Field of Classification Search
CPC ... H04W 16/10; H04W 4/06; H04W 72/0446; H04W 72/1278; H04W 72/0406;
(Continued)

(56) References Cited

U.S. PATENT DOCUMENTS 11,051,174 B2 * 6/2021 Huang .................... H04W 4/06
2016/0142988 A1   5/2016 Powell et al.
(Continued)

OTHER PUBLICATIONS

U.S. Appl. No. 16/543,157 U.S. Pat. No. 11,051,174, filed Aug. 16, 2019, Grouping of Access Points (AP) Into Multi-AP Groups to Enable Coordination of Downlink Transmissions.
(Continued)

*Primary Examiner* — Peter G Solinsky
(74) *Attorney, Agent, or Firm* — Schwegman, Lundberg & Woessner, P.A.

(57) ABSTRACT

Embodiments of an access point (AP), station (STA) and method of communication are generally described herein. The AP may be configurable to operate as a controlling AP of a multi-AP group. The controlling AP may establish the multi-AP group by: transmitting one or more messages to advertise the multi-AP group; and exchanging signaling with one or more of the other APs of the multi-AP group. The signaling may include at least one message related to one of the other APs joining the multi-AP group. The controlling AP may establish the multi-AP group to enable usage of AP Trigger Frames (AP TFs) for coordination of resources to be used for downlink transmissions of the APs of the multi-AP group.

21 Claims, 16 Drawing Sheets

Related U.S. Application Data

(60) Provisional application No. 62/728,241, filed on Sep. 7, 2018, provisional application No. 62/727,117, filed on Sep. 5, 2018, provisional application No. 62/765,024, filed on Aug. 17, 2018.

(51) Int. Cl.

| | | |
|---|---|---|
| *H04W 72/0446* | (2023.01) | |
| *H04L 25/02* | (2006.01) | |
| *H04W 74/08* | (2009.01) | |
| *H04W 88/08* | (2009.01) | |
| *H04W 84/20* | (2009.01) | |
| *H04W 72/20* | (2023.01) | |
| *H04W 92/20* | (2009.01) | |

(52) U.S. Cl.
CPC ....... *H04W 72/0446* (2013.01); *H04W 72/20* (2023.01); *H04W 74/0816* (2013.01); *H04W 84/20* (2013.01); *H04W 88/08* (2013.01); *H04W 92/20* (2013.01)

(58) Field of Classification Search
CPC . H04W 74/0816; H04W 84/20; H04W 88/08; H04W 92/20; H04L 25/0024
USPC ........................................................ 370/338
See application file for complete search history.

(56) References Cited

U.S. PATENT DOCUMENTS

| | | |
|---|---|---|
| 2018/0206274 A1 | 7/2018 | Cherian et al. |
| 2019/0081664 A1 | 3/2019 | Vermani et al. |
| 2019/0132762 A1 | 5/2019 | Zhu et al. |
| 2019/0373569 A1 | 12/2019 | Ram et al. |
| 2020/0037275 A1 | 1/2020 | Liu et al. |
| 2020/0045555 A1 | 2/2020 | Huang et al. |

OTHER PUBLICATIONS

"U.S. Appl. No. 16/543,157, Non Final Office Action dated Oct. 23, 2020", 18 pgs.

"U.S. Appl. No. 16/543,157, Response filed Jan. 15, 2021 to Non Final Office Action dated Oct. 23, 2020", 13 pgs.

"U.S. Appl. No. 16/543,157, Notice of Allowance dated Feb. 11, 2021", 7 pgs.

"U.S. Appl. No. 16/543,157, 312 Amendment filed May 11, 21", 9 pgs.

"U.S. Appl. No. 16/543,157, PTO Response to Rule 312 Communication dated May 13, 2021", 1 pg.

\* cited by examiner

1000

1400

1500

1600

2000

2100

2200

2300

2400

2500

ACCESS POINT (AP) MULTI-LINK DEVICE (MLD) CONFIGURED FOR MULTI-LINK OPERATION (MLO)

PRIORITY CLAIM

This application is a continuation of U.S. patent application Ser. No. 16/543,157, filed Aug. 16, 2019, which claims priority under 35 USC 119(e) to U.S. Provisional Patent Application Ser. No. 62/765,024, filed Aug. 17, 2018 [reference number AB4332-Z, 1884.883PRV], and to U.S. Provisional Patent Application Ser. No. 62/727,117, filed Sep. 5, 2018 [reference number AB4648-Z], and to U.S. Provisional Patent Application Ser. No. 62/728,241, filed Sep. 7, 2018 [reference number AB3883-Z], all of which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to Extremely High Throughput (EHT) protocols. Some embodiments relate to methods, computer readable media, and apparatus for grouping of access points (APs) into multi-AP groups to enable coordination of downlink transmissions.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
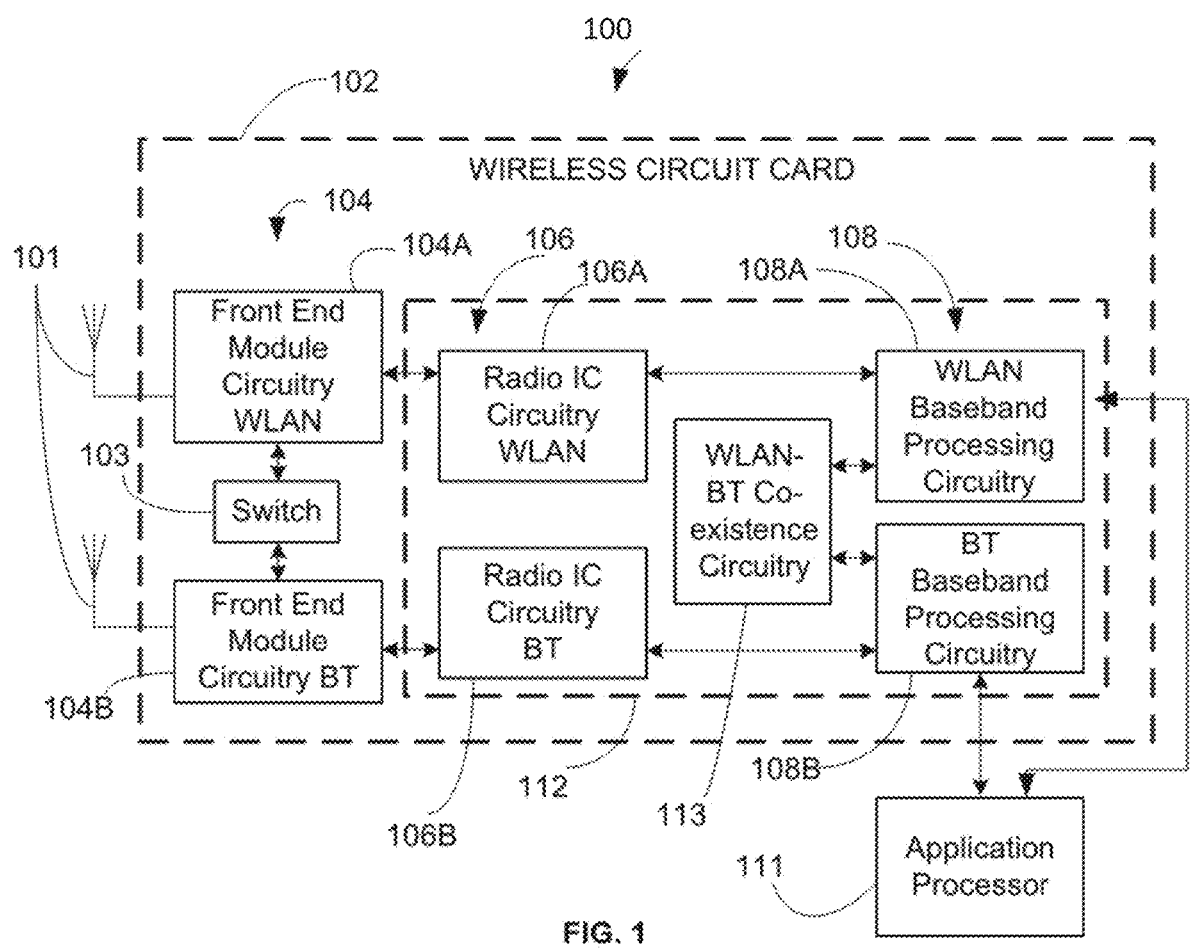
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11 n-2009, IEEE 802.11-2012, IEEE 802.11-2016, IEEE 802.11 ac, and/or IEEE 802.11 ax standards, Extremely High Throughput (EHT) standards, and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured to communicate in accordance with EHT techniques/protocols and/or other 802.11 techniques/protocols. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
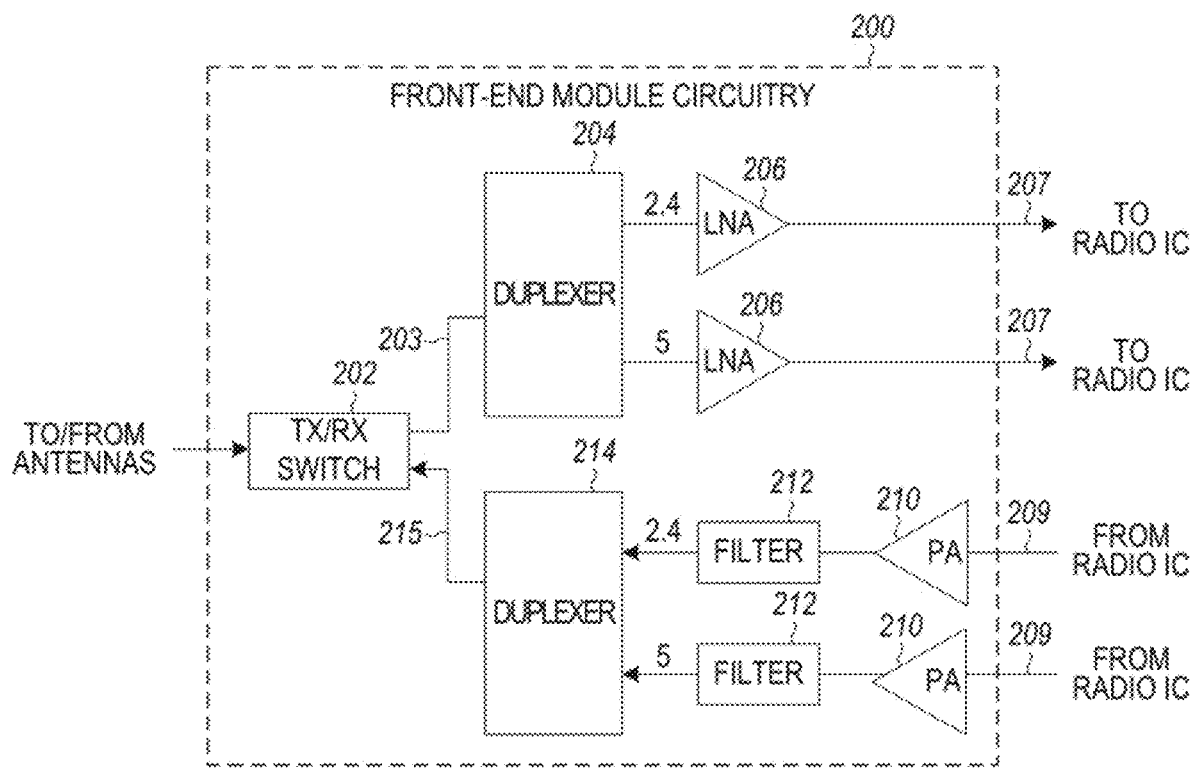
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
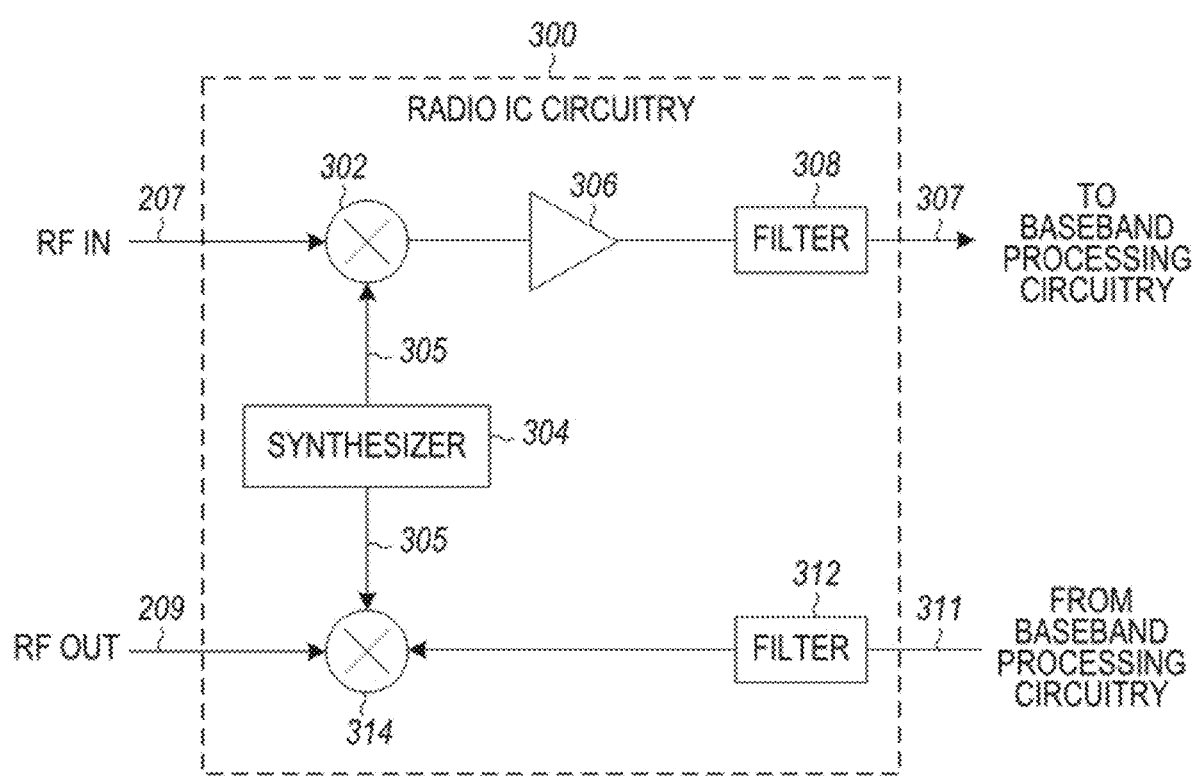
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
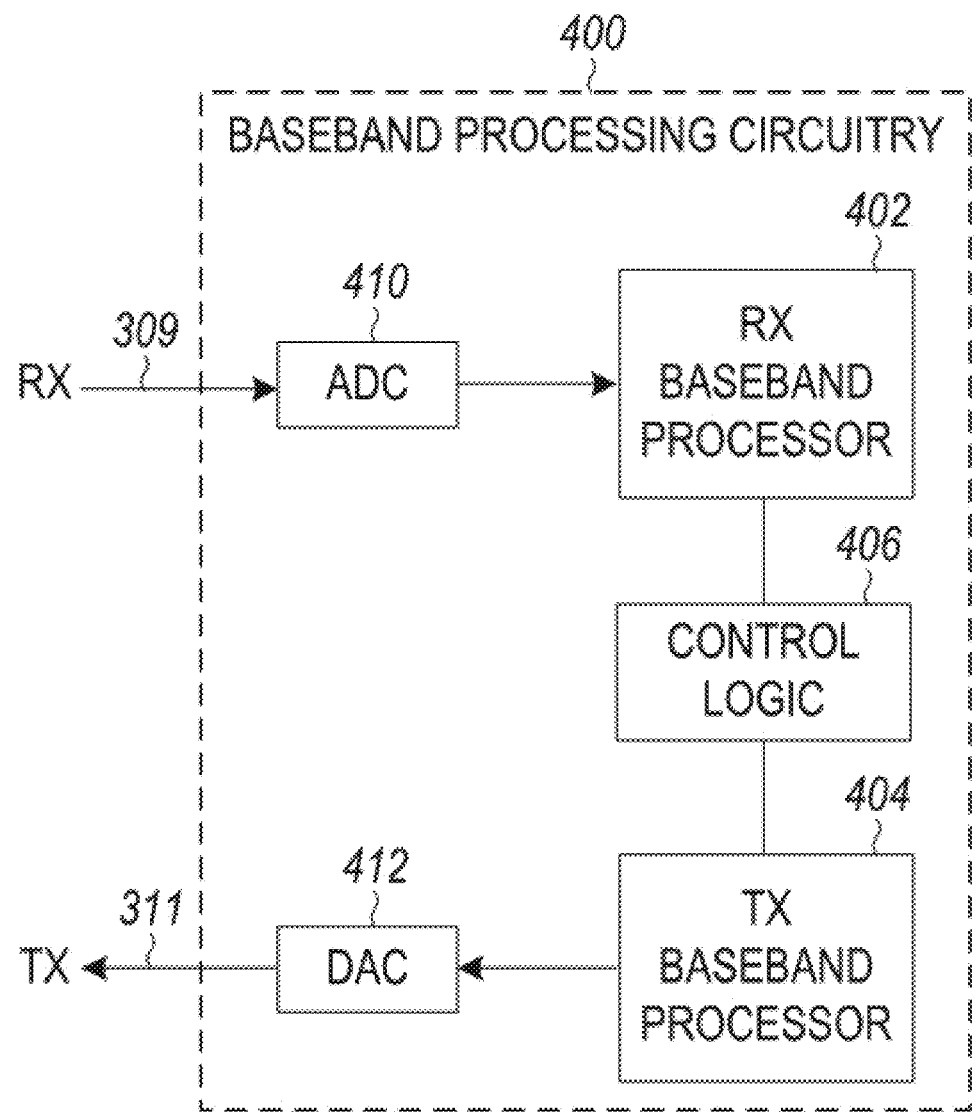
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
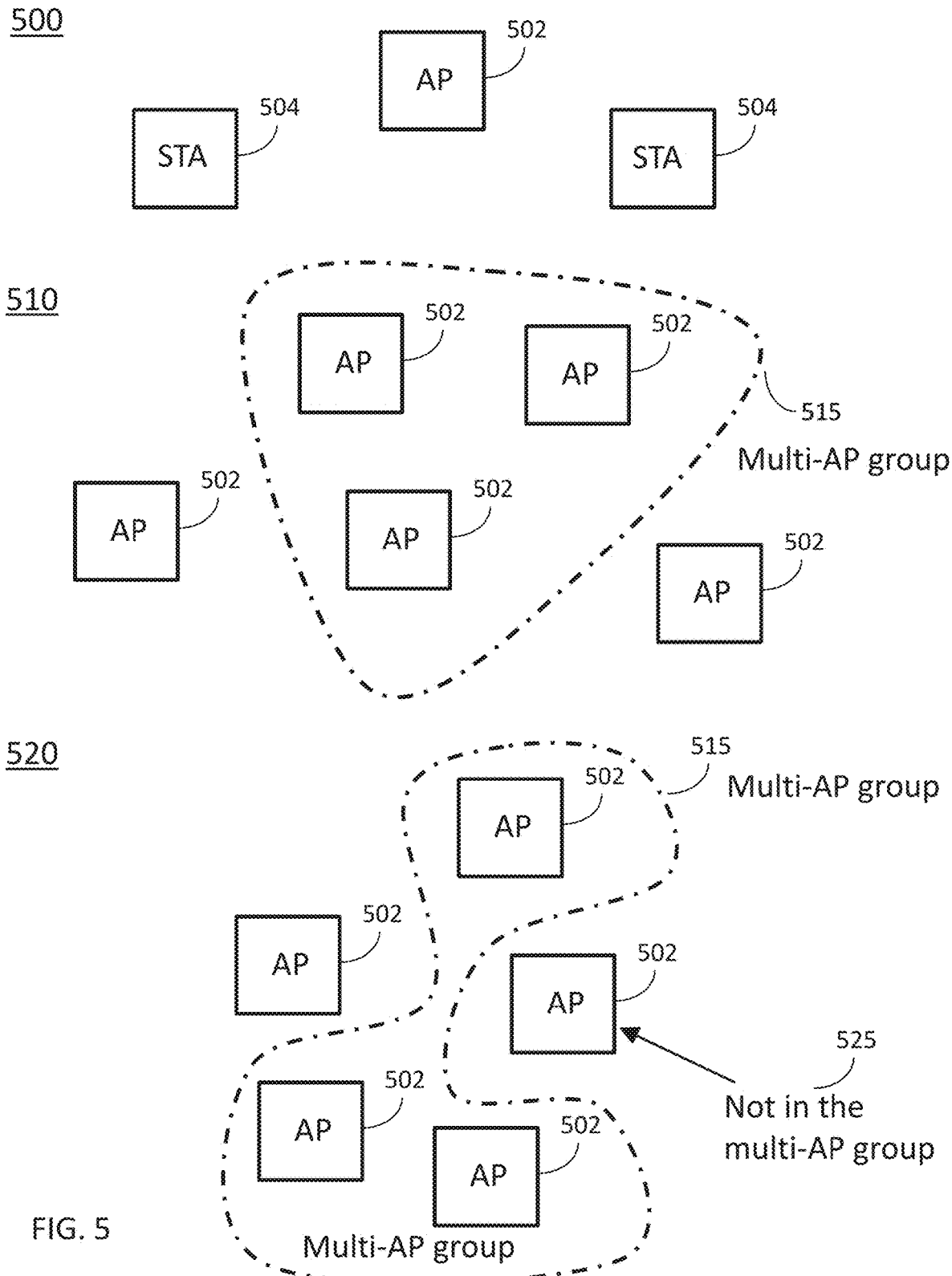
FIG. 5 illustrates a WLAN in accordance with some embodiments.

FIG. 5 illustrates a WLAN 500 in accordance with some embodiments. In some embodiments, the WLAN 500 may comprise an AP 502, and one or more stations (STAs) 504. In some embodiments, the AP 502 may communicate with one or more of the STAs 504. Embodiments are not limited to a single AP 502, as the WLAN 500 may comprise one or more APs 502, in some embodiments.

In some embodiments, multiple APs 502 may be grouped into a multi-AP group 515, which will be described in more detail herein. Example multi-AP groups 515 are shown in the non-limiting examples 510 and 520 in FIG. 5. In some embodiments, one or more factors may determine which APs 502 are in the multi-AP group 515, examples of which are described herein. Such factors may include one or more of: geography, capability, whether or not an AP 502 has requested to join the multi-AP group 515, whether or not the AP 502 has been asked to join the multi-AP group 515, and/or other factor(s). It should be noted that the multi-AP group 515 may not necessarily include APs 502 that are closest to each other geographically, although such arrangements are possible.

In a non-limiting example, 510 illustrates a scenario in which the multi-AP group 515 includes three APs 502. The three APs 502 in the multi-AP group 515 in the scenario 510 may be closest to each other geographically in this case. The geography of the three APs 502 that are included in the multi-AP group 515 may be a factor in whether or not those three APs 502 are included in the multi-AP group 515, although the scope of embodiments is not limited in this respect.

In another non-limiting example, 520 illustrates a scenario in which the multi-AP group 515 includes three APs 502. Those three APs 502 are not the closest to each other geographically, as the AP 502 indicated by 525 is not included in the multi-AP group 515.

The AP 502 may be an AP using the IEEE 802.11 to transmit and receive. The AP 502 may be a base station. The AP 502 may use other communications protocols as well as the IEEE 802.11 protocol. The IEEE 802.11 protocol may be IEEE 802.1 lax, EHT-related, and/or other. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one AP 502 that is part of an extended service set (ESS). A controller (not illustrated) may store information that is common to the more than one APs 502.

The AP 502 and/or the STAs 504 may operate in accordance with one or more of IEEE 802.11 a/b/g/n/ac/ad/af/ah/aj/ay, EHT, or another wireless communication standard. The STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol and/or EHT protocol.

The AP 502 may communicate with the STAs 504 in accordance with IEEE 802.11 communication techniques.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDM A and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A frame and/or MAC protocol data unit (MPDU) may be configured for transmitting a number of spatial streams, which may be in accordance with MU-MIMO and may be in accordance with OFDMA. In other embodiments, the P 502, STA 504, and/or other device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

In example embodiments, the radio architecture of FIG. 1, the front-end module circuitry of FIG. 2, the radio IC circuitry of FIG. 3, and/or the baseband processing circuitry of FIG. 4 may be configured to perform the methods and operations/functions herein described in conjunction with one or more of the figures described herein.

In example embodiments, the STA 504 and/or the AP 502 are configured to perform the methods and operations/functions described herein in conjunction with one or more of the figures described herein. In example embodiments, an apparatus of the STA 504 and/or an apparatus of the AP 502 are configured to perform the methods and functions described herein in conjunction with one or more of the figures described herein. The term Wi-Fi may refer to one or more of the IEEE 802.11 communication standards.

Figure 6:
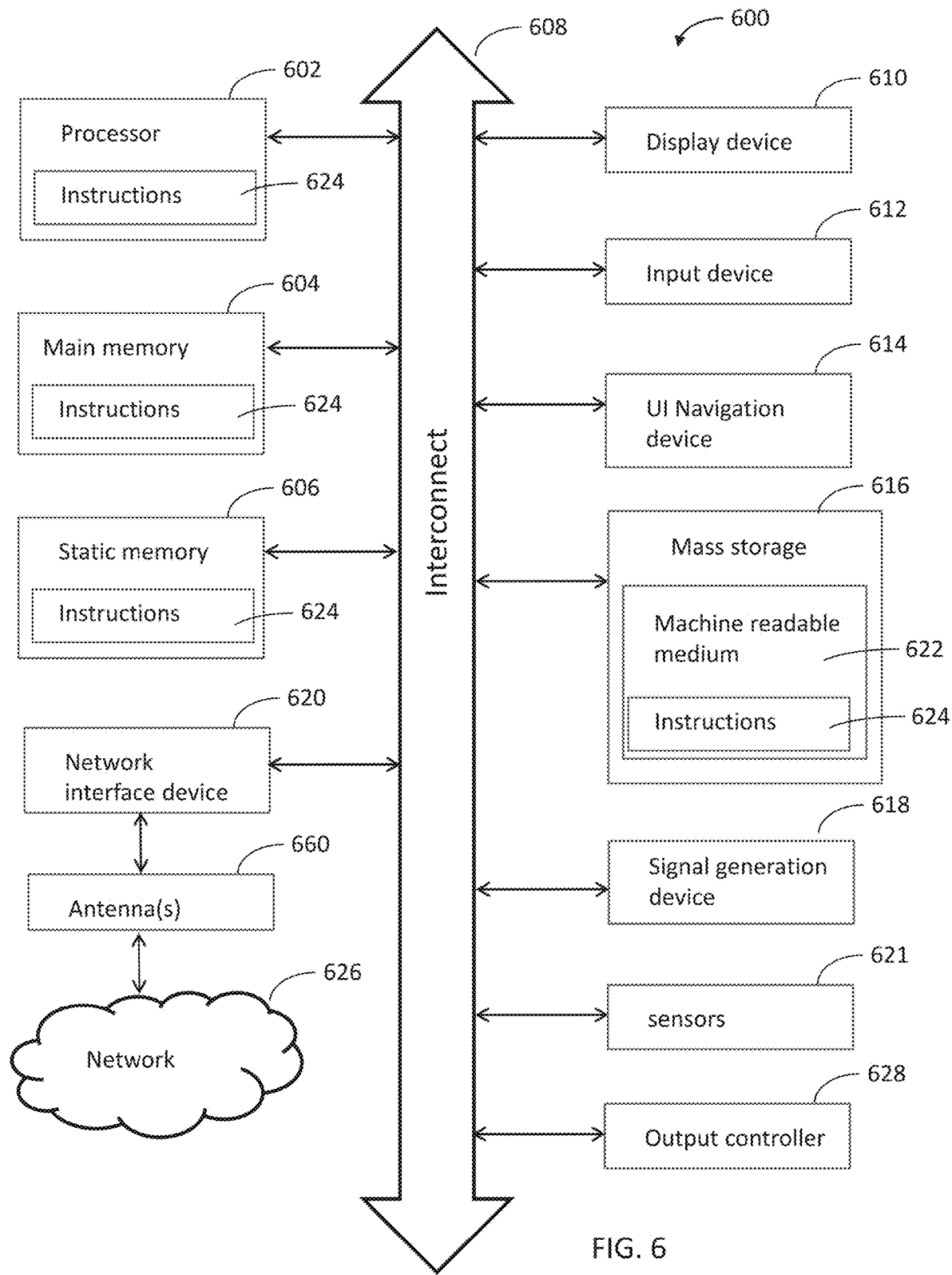
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be an AP 502, STA 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal. In some examples, machine readable media may include non-transitory computer readable storage media. In some examples, machine readable media may include computer readable storage media.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
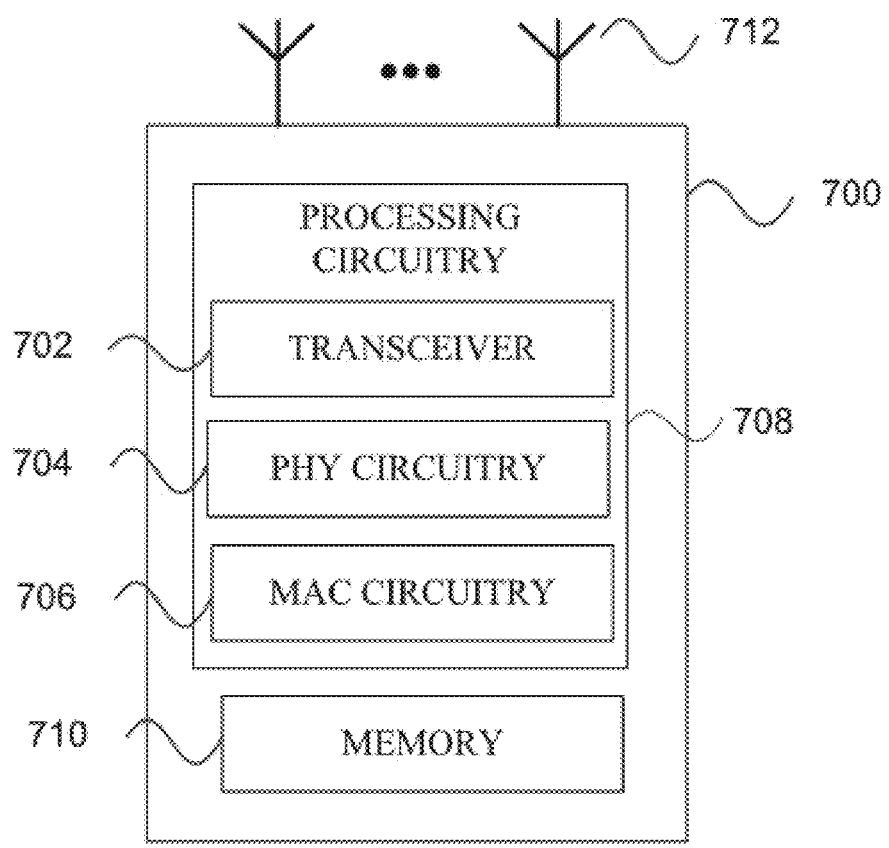
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be an AP 502 and/or STA 504 (e.g., FIG. 5). An STA 504 and/or AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., AP 502, STA 504 and/or other devices) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., AP 502 and/or STA 504), in some embodiments. In some embodiments, the wireless device 700 is configured to decode and/or encode signals, packets, and/or frames as described herein, e.g., PPDUs.

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In accordance with some embodiments, an AP 502 may be configurable to operate as a-controlling AP 502 of a multi-AP group 515. The controlling AP 502 may establish the multi-AP group 515. The multi-AP group 515 may include the controlling AP 502 and one or more other APs 502. To establish the multi-AP group 515, the controlling AP 502 may: transmit one or more messages to advertise the multi-AP group 515; exchange signaling with one or more of the other APs 502, wherein the signaling may include at least one message related to one of the other APs 502 joining the multi-AP group 515. The controlling AP 502 may establish the multi-AP group 515 to enable usage of AP Trigger Frames (AP TFs) for coordination of resources to be used for downlink transmissions of the APs 502 of the multi-AP group 515. The controlling AP 502 may transmit, to the APs 502 of the multi-AP group 515, an AP TF that indicates resources to be used by one or more of the APs 502 of the multi-AP group 515 for the downlink transmissions. The resources may include one or more of: time resources, frequency resources, and spatial resources. These embodiments are described in more detail below.

Figure 8:
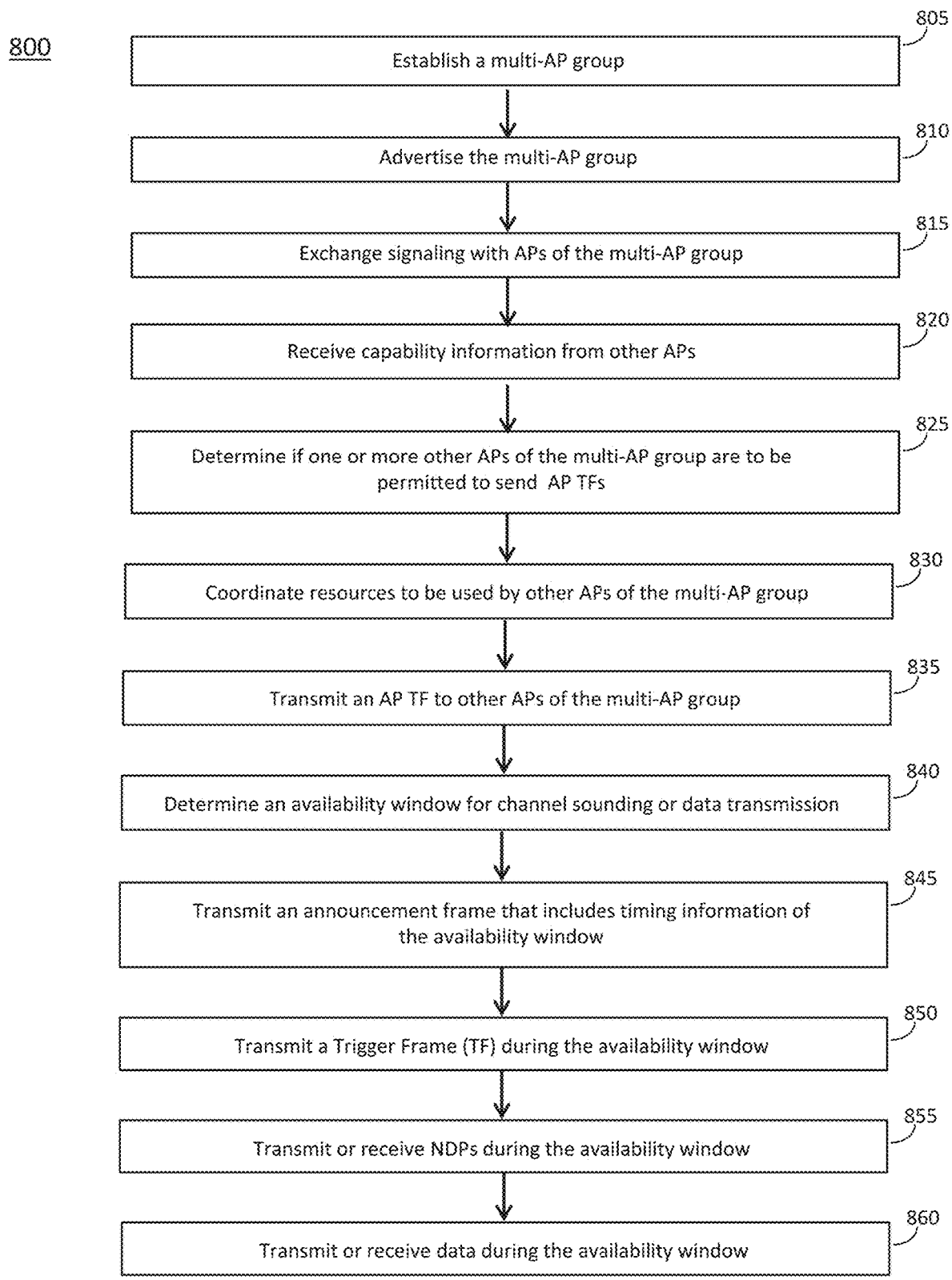
FIG. 8 illustrates the operation of a method in accordance with some embodiments.
Figure 9:
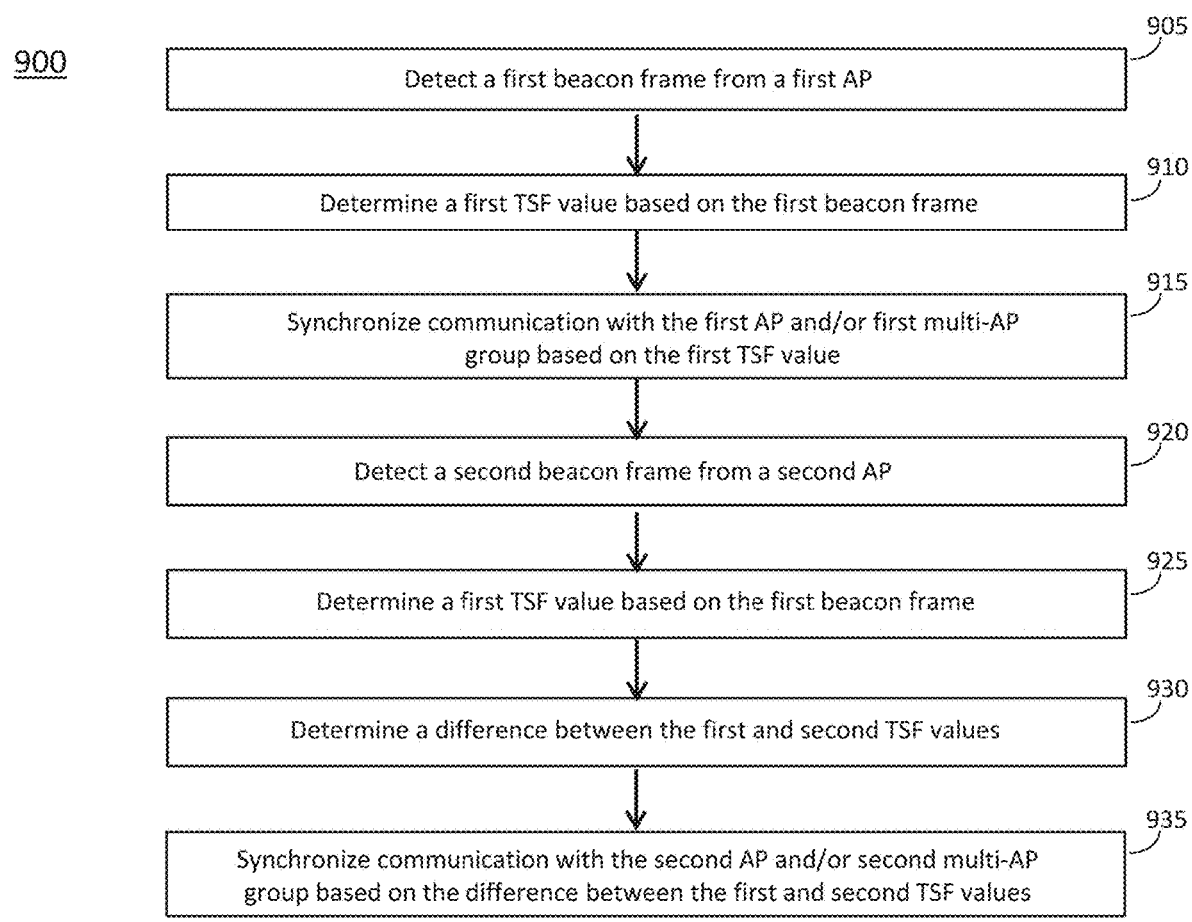
FIG. 9 illustrates the operation of another method in accordance with some embodiments.

FIG. 8 illustrates the operation of a method of communication in accordance with some embodiments. FIG. 9 illustrates the operation of another method of communication in accordance with some embodiments. It is important to note that embodiments of the methods 800, 900 may include additional or even fewer operations or processes in comparison to what is illustrated in FIGS. 8-9. In addition, embodiments of the methods 800, 900 are not necessarily limited to the chronological order that is shown in FIGS. 8-9. In descriptions of the methods 800, 900, reference may be made to one or more figures, although it is understood that the methods 800, 900 may be practiced with any other suitable systems, interfaces and components.

In some embodiments, an AP 502 may perform one or more operations of the method 800, but embodiments are not limited to performance of the method 800 and/or operations of it by the AP 502. In some embodiments, another device and/or component may perform one or more operations that may be the same as, similar to and/or reciprocal to one or more operations of the method 800. In a non-limiting example, the STA 504 may perform an operation that may be the same as, similar to, reciprocal to and/or related to an operation of the method 800, in some embodiments.

In some embodiments, an STA 504 may perform one or more operations of the method 900, but embodiments are not limited to performance of the method 900 and/or operations of it by the STA 504. In some embodiments, another device and/or component may perform one or more operations that may be the same as, similar to and/or reciprocal to one or more operations of the method 900. In a non-limiting example, the AP 502 may perform an operation that may be the same as, similar to, reciprocal to and/or related to an operation of the method 900, in some embodiments.

It should be noted that one or more operations of one method (such as 800, 900 and/or other method described herein) may be the same as, similar to and/or reciprocal to one or more operations of another method (such as 800, 900 and/or other method described herein). For instance, an operation of the method 800 may be the same as, similar to and/or reciprocal to an operation of the method 900, in some embodiments. In a non-limiting example, an operation of the method 800 may include transmission of an element (such as a frame, block, message and/or other) by the AP 502, and an operation of another method may include reception of a same element (and/or similar element) by the STA 504. In some cases, descriptions of operations and techniques described as part of one method (such as 800, 900 and/or other method described herein) may be relevant to another method (such as 800, 900 and/or other method described herein). Discussion of various techniques and concepts described as part of one method (such as 800, 900 and/or other method described herein) may be relevant to another method (such as 800, 900 and/or other method described herein), although the scope of embodiments is not limited in this respect.

The methods 800, 900 and other methods described herein may refer to APs 502, STAs 504 and/or other devices configured to operate in accordance with WLAN standards, 802.11 standards and/or other standards. However, embodiments are not limited to performance of those methods by those components, and may also be performed by other devices, such as an Evolved Node-B (eNB), User Equipment (UE) and/or other. In addition, the methods 800, 900 and other methods described herein may be practiced by wireless devices configured to operate in other suitable types of wireless communication systems, including systems configured to operate according to Third Generation Partnership Project (3GPP) standards, 3GPP Long Term Evolution (LTE) standards, 5G standards, New Radio (NR) standards and/or other standards.

In some embodiments, the methods 800, 900 and/or other method described herein may also be applicable to an apparatus of an AP 502, an apparatus of a STA 504 and/or an apparatus of another device. In some embodiments, an apparatus of an AP 502 may perform one or more operations of the method 800 and/or other operations. In some embodiments, an apparatus of a STA 504 may perform one or more operations of the method 900 and/or other operations.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to WLAN, IEEE 802.11, EHT and/or other. The scope of embodiments is not limited to usage of those elements, however. In some embodiments, different elements, similar elements, alternate elements and/or other elements may be used. The scope of embodiments is also not limited to usage of elements that are included in standards.

At operation 805, the AP 502 may establish a multi-AP group 515. At operation 810, the AP 502 may advertise the multi-AP group 515. At operation 815, the AP 502 may exchange signaling with APs 502 of the multi-AP group 515. At operation 820, the AP 502 may receive capability information from other APs 502. At operation 825, the AP 502 may determine if one or more other APs 502 of the multi-AP group 515 are to be permitted to send AP TFs. At operation 830, the AP 502 may coordinate resources to be used by other APs 502 of the multi-AP group 515. At operation 835, the AP 502 may transmit an AP TF to other APs 502 of the multi-AP group 515.

In some embodiments, the AP 502 may be configurable to operate as a controlling AP 502 of a multi-AP group 515. The controlling AP 502 may establish the multi-AP group 515. The multi-AP group 515 may include the controlling AP 502 and one or more other APs 502. To establish the multi-AP group 515, the controlling AP 502 may perform one or more of: transmit one or more messages to advertise the multi-AP group 515; exchange signaling with one or more of the other APs 502, wherein the signaling includes at least one message related to one of the other APs 502 joining the multi-AP group 515; and/or other.

In some embodiments, the controlling AP 502 may establish the multi-AP group 515 to enable usage of AP Trigger Frames (AP TFs) for coordination of resources to be used for downlink transmissions of the APs 502 of the multi-AP group 515. In some embodiments, the controlling AP 502 may establish the multi-AP group 515 to reduce interference between the downlink transmissions of the APs 502 of the multi-AP group 515.

In some embodiments, the controlling AP 502 may transmit, to the APs 502 of the multi-AP group 515, an AP TF. In some embodiments, the AP TF may indicate/include one or more of: resources to be used by one or more of the APs 502 of the multi-AP group 515 for the downlink transmissions; and/or other. In some embodiments, the resources may include one or more of: time resources, frequency resources, spatial resources; and/or other.

In some embodiments, the controlling AP 520 may transmit the AP TF during a transmission opportunity (TXOP) obtained by the controlling AP 502. In some embodiments, the resources indicated by the AP TF are to be used, during the TXOP, by the one or more of the APs 502 of the multi-AP group 515 for the downlink transmissions.

In some embodiments, the signaling exchanged to establish the multi-AP group 515 may include one or more of: a join request message from one of the other APs 502; a join response message from the controlling AP 502; and/or other. In some embodiments, the controlling AP 502 may encode the join response message to indicate an AP identifier (AP ID) assigned to the AP 502 from which a join request message was received.

In some embodiments, the controlling AP 502 may receive capability information from one or more of the APs 502 of the multi-AP group 515. In some embodiments, the capability information may indicate one or more of: whether the other APs 502 of the multi-AP group 515 are capable of transmitting AP TFs (for instance, another AP 502 may send capability information that indicates whether the AP 502 is capable of transmitting AP TFs); whether the other APs 502 of the multi-AP group 515 are able to join multi-AP groups 515; and/or other information.

In some embodiments, the controlling AP 502 may determine, based at least partly on the capability information, whether one or more of the other APs 502 of the multi-AP group 515 are permitted (and/or will be permitted) to transmit AP TFs. In some embodiments, the controlling AP 502 may transmit signaling that identifies the other APs 502 of the multi-AP group 515 that are permitted to transmit AP TFs. In some embodiments, the controlling AP 502 may transmit the signaling to one or more other APs 502 of the multi-AP group 515. In some embodiments, the controlling AP 502 may transmit the signaling to one or more STAs 504 associated with the controlling AP 502.

In some embodiments, the signaling (which identifies the other APs 502 of the multi-AP group 515 that are permitted to transmit AP TFs) may be encoded, by the controlling AP 502, for transmission to the other APs 502 of the multi-AP group 515. In some embodiments, the signaling (which identifies the other APs 502 of the multi-AP group 515 that are permitted to transmit AP TFs) may be encoded, by the controlling AP 502, for transmission to the other APs 502 of the multi-AP group 515 for forwarding, by each of the other APs 502, to associated STAs 504. For instance, one of the other APs 502 may forward the information (related to which APs 502 of the multi-AP group 515 are permitted to transmit AP TFs) to the STAs 504 associated to the AP 502.

In some embodiments, the controlling AP 502 may, after the multi-AP group 515 is established, perform one or more of: receive, from an AP 502 that is not in the multi-AP group 515, signaling that includes capability information related to whether the AP 502 that is not in the multi-AP group 515 is capable of joining the multi-AP group 515; determine, based at least partly on the capability information, whether to initiate a process to add the AP 502 that is not in the multi-AP group 515 to the multi-AP group 515; and/or other. Embodiments are not limited to performance of those operations after the multi-AP group 515 is established.

In some embodiments, an AP 502 that is not in the multi-AP group 515 (which will be referred to for clarity as a first AP 502) may transmit signaling to the controlling AP 502 that includes capability information for a second AP 502, wherein the second AP 502 is not in the multi-AP group 515. Accordingly, the controlling AP 502 may receive the capability information for the second AP 502 from the first AP 502 on behalf of the second AP 502. In some embodiments, the controlling AP 502 may determine, based at least partly on the capability information for the second AP 502, whether to add the second AP 502 to the multi-AP group 515.

In some embodiments, the controlling AP 502 may coordinate first resources to be used by a first AP 502 of the multi-AP group 515 and second resources to be used by a second AP 502 of the multi-AP group 515. The controlling AP 502 may determine the first and second resources to be at least partly non-overlapping in the time domain and/or frequency domain (including but not limited to orthogonal or partly orthogonal resources). The controlling AP 502 may encode the AP TF to indicate the first and second resources.

In some embodiments, the controlling AP 502 may coordinate first resources to be used by a first AP 502 of the multi-AP group 515 and second resources to be used by a second AP 502 of the multi-AP group 515. The controlling AP 502 may determine the first and second resources to be at least partly non-overlapping in the spatial domain (including but not limited to orthogonal or partly orthogonal resources). The controlling AP 502 may encode the AP TF to indicate the first and second resources.

In some embodiments, the controlling AP 502 may coordinate first resources to be used by a first AP 502 of the multi-AP group 515 and second resources to be used by a second AP 502 of the multi-AP group 515. The controlling AP 502 may determine the first and second resources to be at least partly non-overlapping in one or more of: the time domain, the frequency domain, the spatial domain, and/or other (including but not limited to orthogonal or partly orthogonal resources). The controlling AP 502 may encode the AP TF to indicate the first and second resources.

In some embodiments, the multi-AP group 515 may be configurable for one or more of: a first arrangement in which the controlling AP 502 is permitted to transmit AP TFs to coordinate the downlink transmissions, and the other APs 502 are not permitted to send AP TFs to coordinate the downlink transmissions; a second arrangement in which the controlling AP 502 and one or more of the other APs 502 are permitted to transmit AP TFs to coordinate the downlink transmissions; and/or other.

At operation 840, an AP 502 (controlling AP 502 and/or other AP 502) may determine an availability window for channel sounding or data transmission. At operation 845, an AP 502 (controlling AP 502 and/or other AP 502) may transmit an announcement frame that includes timing information of the availability window. At operation 850, an AP 502 (controlling AP 502 and/or other AP 502) may transmit a Trigger Frame (TF) during the availability window. At operation 855, an AP 502 (controlling AP 502 and/or other AP 502) may transmit or receive NDPs during the availability window. At operation 860, an AP 502 (controlling AP 502 and/or other AP 502) may transmit or receive data during the availability window.

It should be noted that some embodiments may not necessarily include all operations shown in FIG. 8. In a non-limiting example, an AP 502 may perform one or more of operations 805-835, but may not necessarily perform one or more of operations 840-860. In another non-limiting example, an AP 502 may perform one or more of operations 840-860, but may not necessarily perform one or more of operations 805-835.

In addition, descriptions herein may refer to performance of operations 840-860 by a controlling AP 502 that is part of a multi-AP group 515 that includes a subordinate AP 502. It is understood, however, that the scope of embodiments is not limited to this arrangement. In some embodiments, the controlling AP 502 referred to in descriptions of operations 840-860 may be an AP 502 of a basic service set (BSS), and the subordinate AP 502 referred to in descriptions of operations 840-860 may be an AP 502 of an overlapping BSS (OBSS).

In some embodiments, the AP 502 may configurable to operate as a controlling AP 502 of a multi-AP group 515. The controlling AP 502 may determine an availability window for channel sounding by one or more STAs 504 associated with the controlling AP 502 and by one or more STAs 504 associated with a subordinate AP 502 of the multi-AP group 515. In some embodiments, the availability window may be configurable for uplink channel sounding or downlink channel sounding. The controlling AP 502 may encode an announcement frame that indicates one or more of: timing information related to the availability window; whether the availability window is for uplink channel sounding or downlink channel sounding; and/or other. In some embodiments, the announcement frame may be encoded for transmission to the subordinate P 502. In some embodiments, the announcement frame may be encoded for transmission to the subordinate AP 502 and for forwarding to the STAs 504 associated with the subordinate AP 502.

In some embodiments, the controlling AP 502 may, if the availability window is for uplink channel sounding, during the availability window, encode a trigger frame (TF) for transmission to the STAs 504 associated with the controlling AP 502 and to the STAs 504 associated with the subordinate AP 502. In some embodiments, the TF may trigger uplink null data packets (NDPs) from the STAs 504 associated with the controlling AP 502 and from the STAs 504 associated with the subordinate AP 502. In some embodiments, the controlling AP 502 may, during the availability window, perform one or more of: attempt to detect the uplink NDPs; based on detected uplink NDPs, determine uplink channel state information (CSI) of the corresponding STAs 504; and/or other. In some embodiments, the controlling AP 502 may determine, based on the uplink CSI, downlink CSI for the corresponding STAs 504.

In some embodiments, the controlling AP 502 may, if the availability window is for downlink channel sounding, during the availability window, encode the TF for transmission to the subordinate AP 502 to trigger the downlink channel sounding. The controlling AP 502 may, during the availability window, encode one or more NDPs for transmission to the STAs 504 associated with the controlling AP 502 and/or the STAs 504 associated with the subordinate AP 502.

In some embodiments, the controlling AP 502 may receive, from the subordinate AP 502, an announcement frame that indicates a preferred availability window of the subordinate AP 502. In some embodiments, the controlling AP 502 may determine the availability window based on one or more of: a preferred availability window of the controlling AP; the preferred availability window of the subordinate AP; and/or other.

In some embodiments, the controlling AP 502 may determine a second availability window for data transmission between the controlling AP 502 and subordinate APs 502 and one or more of the STAs 504 associated with the subordinate AP 502 or controlling APs 502. In some embodiments, the second availability window may be configurable for uplink data transmission or downlink data transmission. In some embodiments, the controlling AP 502 may encode the announcement frame to indicate one or more of: timing information related to the second availability window; whether the second availability window is for uplink data transmission or downlink data transmission; and/or other.

In some embodiments, the controlling AP 502 may, if the availability window is for uplink data transmission, perform one or more of: encode the trigger frame to trigger transmission of uplink data packets during the second availability window; decode uplink data packets received during the second availability window from one or more of the STAs 504 associated with the subordinate AP or controlling AP 502, and/or other.

In some embodiments, the controlling AP 502 may, if the availability window is for downlink data transmission, perform one or more of: encode the trigger frame for transmission to the subordinate AP 502 to trigger transmission of downlink data packets during the second availability window; encode the downlink data packets for transmission during the second availability window to one or more of the STAs 504 associated with the subordinate AP 502 or controlling AP 502; and/or other.

In some embodiments, an apparatus of an AP 502 may comprise memory. The memory may be configurable to store one or more elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to one or more operations of the method 800. The apparatus may include a transceiver to transmit and/or receive one or more blocks, messages and/or other elements.

At operation 905, the STA 504 may detect a first beacon frame from a first AP 502. At operation 910, the STA 504 may determine a first TSF value based on the first beacon frame. At operation 915, the STA 504 may synchronize communication with the first AP 502 and/or first multi-AP group based on the first TSF value. At operation 920, the STA 504 may detect a second beacon frame from a second AP 502. At operation 925, the STA 504 may determine a first TSF value based on the first beacon frame. At operation 930, the STA 504 may determine a difference between the first and second TSF values. At operation 935, the STA 504 may synchronize communication with the second AP 502 and/or second multi-AP group based on the difference between the first and second TSF values.

In some embodiments, the STA 504 may detect a first beacon frame from a first AP 502 of a first multi-AP group 515. The first multi-AP group 515 may comprise a first plurality of APs 502 synchronized in time according to a first time synchronization function (TSF) value. The STA 504 may determine the first TSF value based on the first beacon frame. The STA 504 may use the first TSF value to synchronize communication with one or more of: the APs 502 of the first plurality of APs 502; STAs 504 associated with the APs 502 of the first plurality of APs 502; and/or other.

In some embodiments, the STA 504 may detect a second beacon frame from a second AP 502 of a second multi-AP group 515. The second multi-AP group 515 may comprise a second plurality of APs 502 synchronized in time according to a second TSF value. The STA 504 may determine the second TSF value based on the second beacon frame. The STA 504 may determine a difference between the first and second TSF values. The STA 504 may use the difference between the first and second TSF values to synchronize communication with one or more of: the APs 502 of the second plurality of APs 502; STAs 504 associated with the APs 502 of the second plurality of APs 502; and/or other.

In some embodiments, if the STA 504 detects another beacon frame from another AP 502 that belongs to another multi-AP group 515, the STA 504 may perform one or more of: determine a TSF value of the other AP 502; determine a difference between the first TSF value and the TSF value of the other AP 502; communicate with the other AP 502 or with STAs 504 associated with the other AP 502; use the difference between the first TSF value and the TSF value of the other AP 502 without synchronization to the TSF value of the other AP 502; and/or other.

In some embodiments, an apparatus of a STA 504 may comprise memory. The memory may be configurable to store one or more elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to one or more operations of the method 900. The apparatus may include a transceiver to transmit and/or receive one or more blocks, messages and/or other elements.

Figure 10:
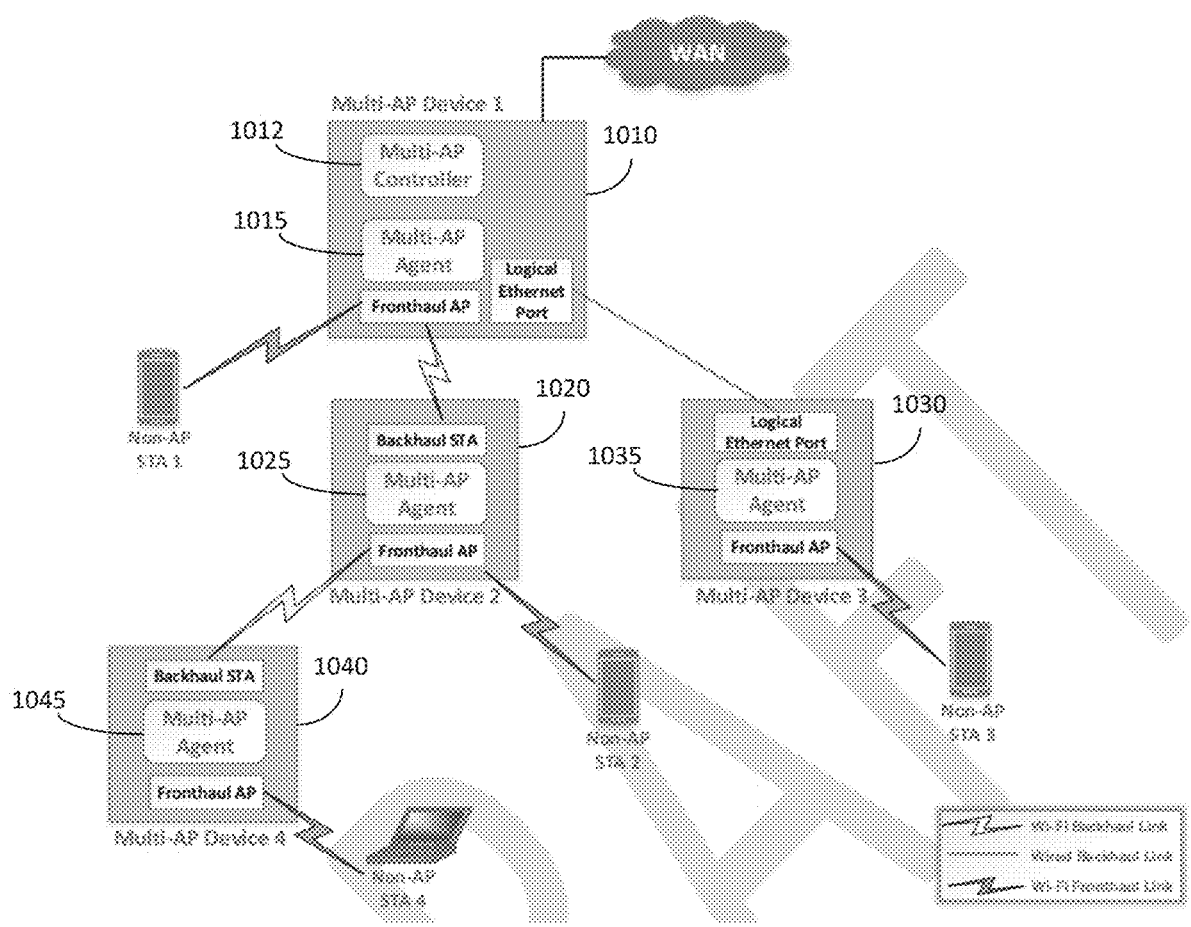
FIG. 10 illustrates an example multi-AP network in accordance with some embodiments.
Figure 11:
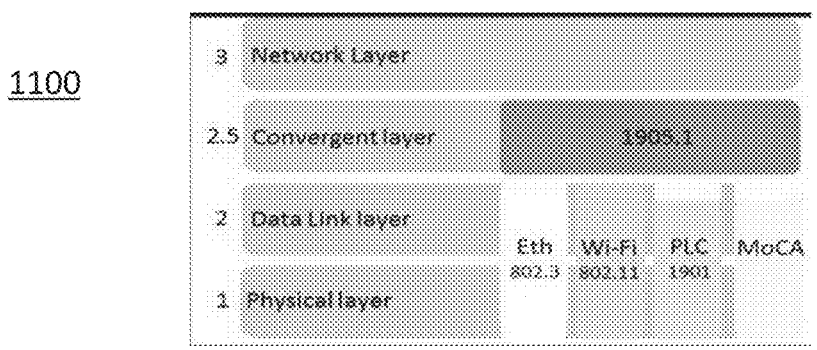
FIG. 11 illustrates example protocol layers in accordance with some embodiments.
Figure 12:
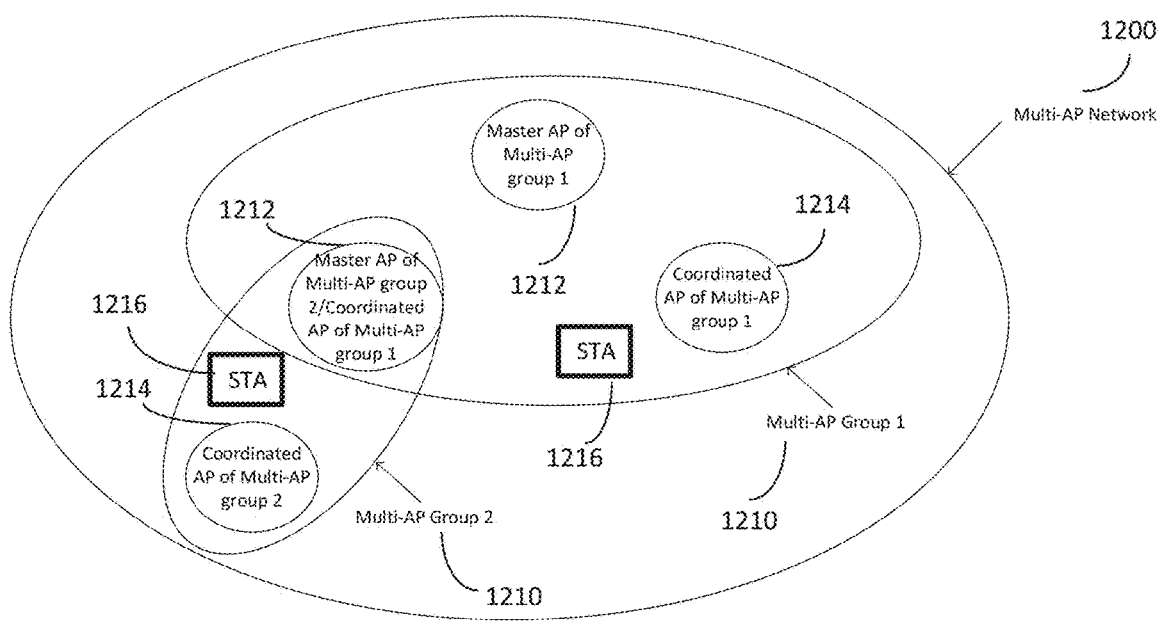
FIG. 12 illustrates examples of multi-AP groups in accordance with some embodiments.
Figure 13:
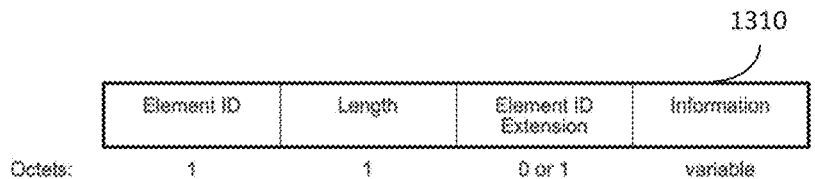
FIG. 13 illustrates an example element in accordance with some embodiments.
Figure 14:
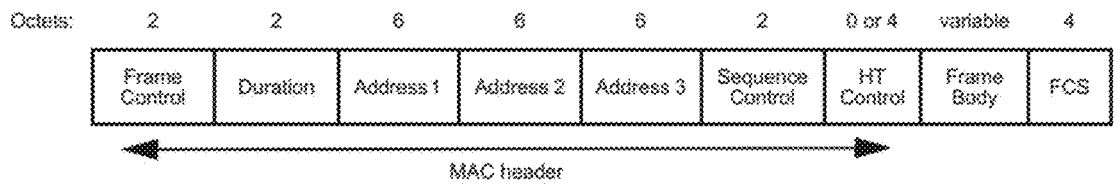
FIG. 14 illustrates an example element in accordance with some embodiments.
Figure 15:
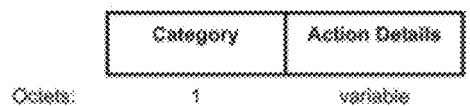
FIG. 15 illustrates an example element in accordance with some embodiments.
Figure 16:
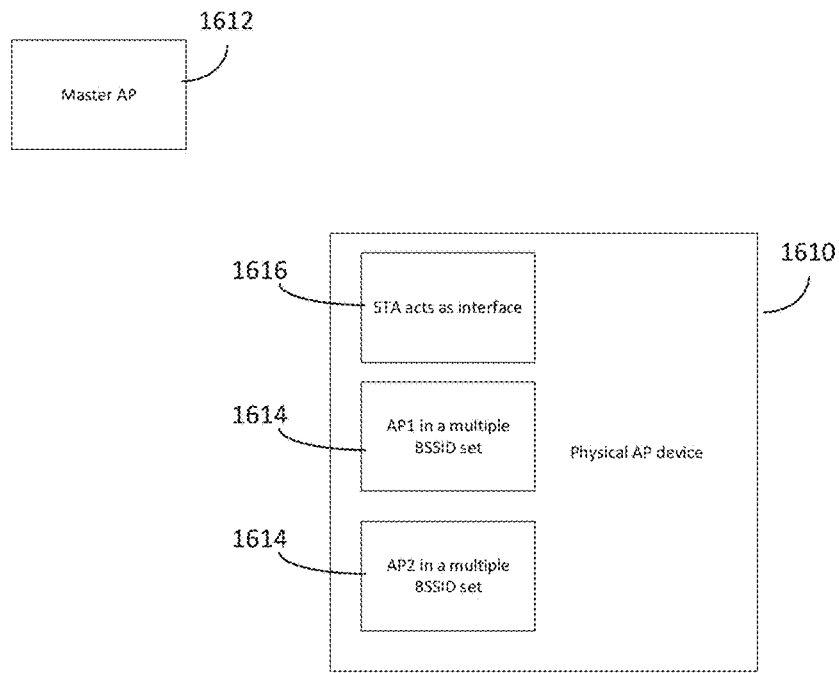
FIG. 16 illustrates an example device configuration in accordance with some embodiments.
Figure 17:
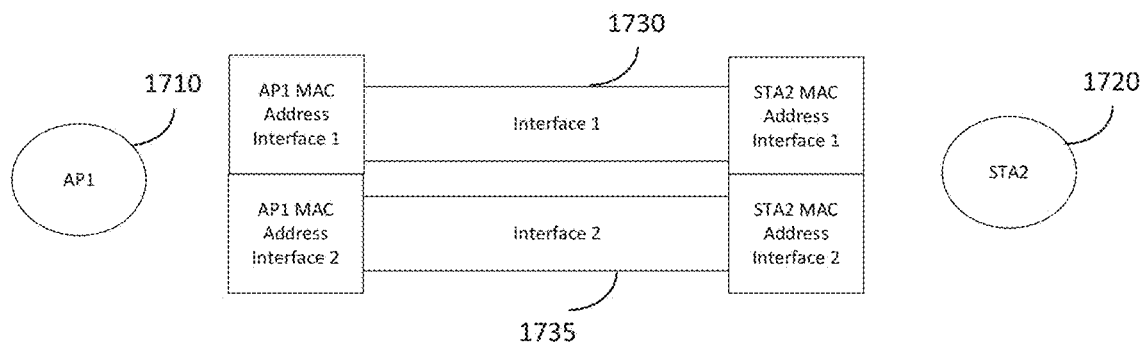
FIG. 17 illustrates an example of connectivity between an AP 502 and an STA 504 in accordance with some embodiments.
Figure 18:
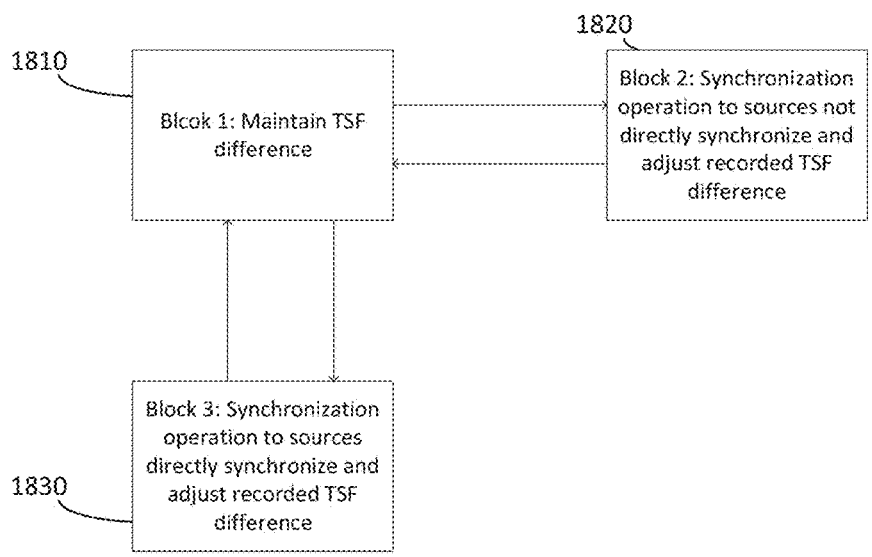
FIG. 18 illustrates example operations and blocks in accordance with some embodiments.
Figure 19:
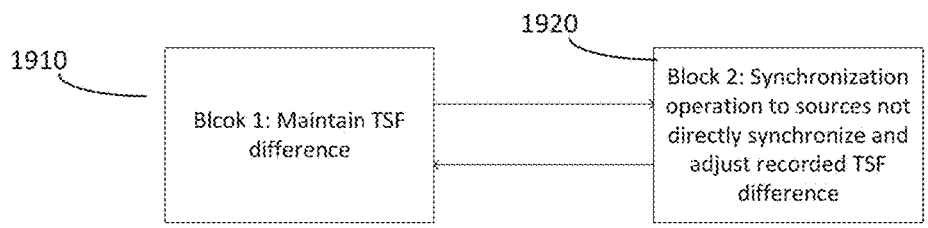
FIG. 19 illustrates example operations and blocks in accordance with some embodiments.
Figure 20:
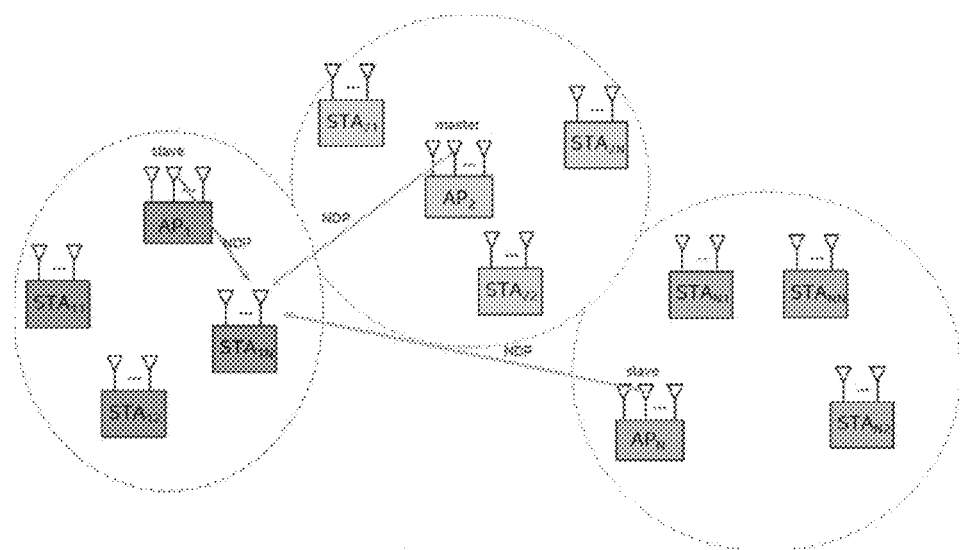
FIG. 20 illustrates an example of cooperation between APs 502 in accordance with some embodiments.
Figure 21:
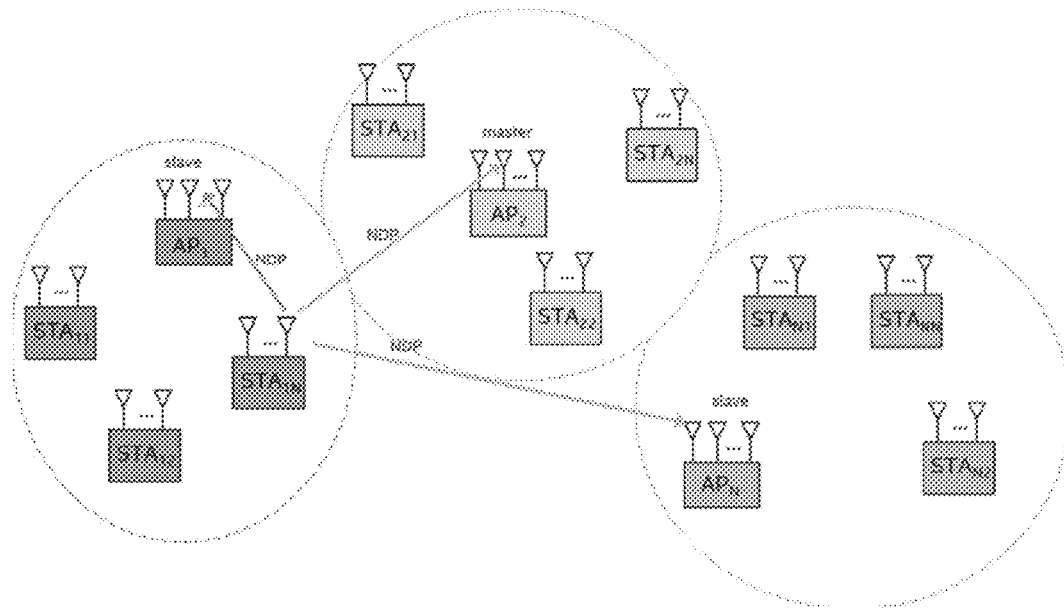
FIG. 21 illustrates an example of cooperation between APs 502 in accordance with some embodiments.
Figure 22:
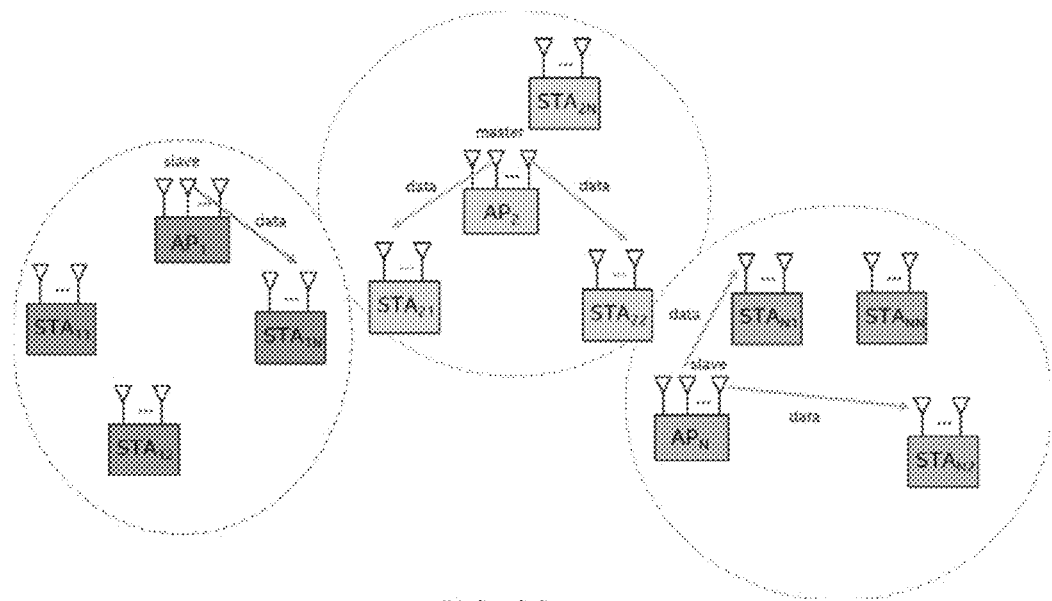
FIG. 22 illustrates an example of cooperation between APs 502 in accordance with some embodiments.
Figure 23:
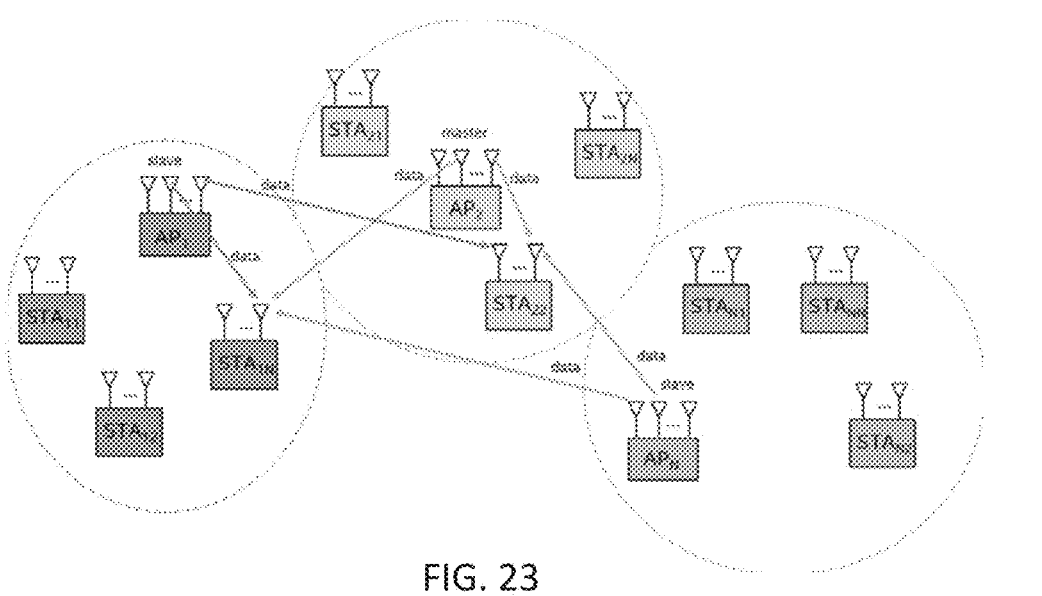
FIG. 23 illustrates an example of cooperation between APs 502 in accordance with some embodiments.
Figure 24:
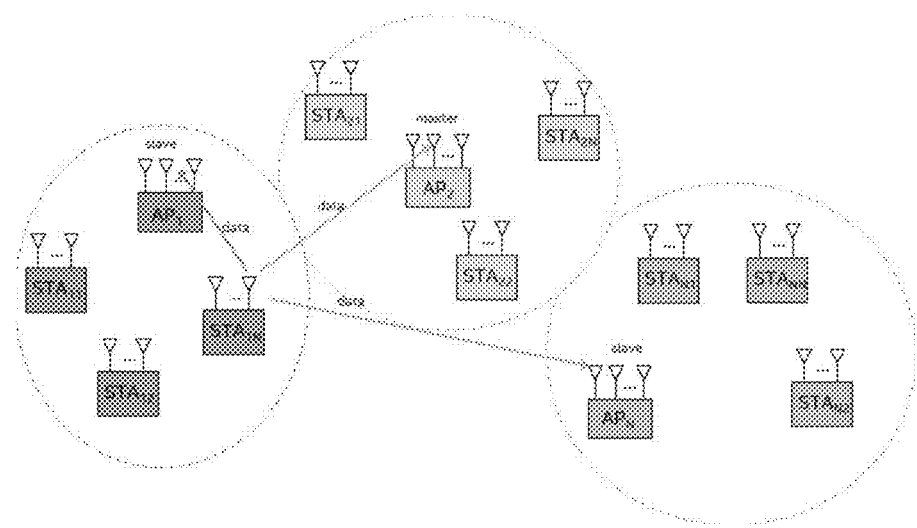
FIG. 24 illustrates an example of cooperation between APs 502 in accordance with some embodiments.
Figure 25:
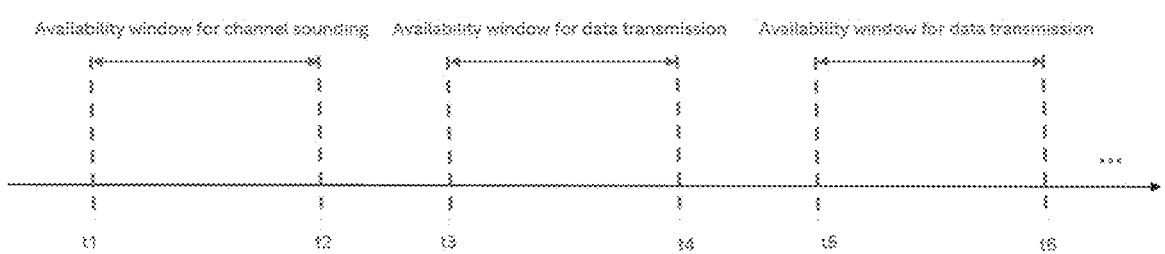
FIG. 25 illustrates example availability windows in accordance with some embodiments.

FIG. 10 illustrates an example multi-AP network in accordance with some embodiments. FIG. 11 illustrates example protocol layers in accordance with some embodiments. FIG. 12 illustrates examples of multi-AP groups in accordance with some embodiments. FIG. 13 illustrates an example element in accordance with some embodiments. FIG. 14 illustrates an example element in accordance with some embodiments. FIG. 15 illustrates an example element in accordance with some embodiments. FIG. 16 illustrates an example device configuration in accordance with some embodiments. FIG. 17 illustrates an example of connectivity between an AP 502 and an STA 504 in accordance with some embodiments. FIG. 18 illustrates example operations and blocks in accordance with some embodiments. FIG. 19 illustrates example operations and blocks in accordance with some embodiments. FIG. 20 illustrates an example of cooperation between APs 502 in accordance with some embodiments. FIG. 21 illustrates an example of cooperation between APs 502 in accordance with some embodiments. FIG. 22 illustrates an example of cooperation between APs 502 in accordance with some embodiments. FIG. 23 illustrates an example of cooperation between APs 502 in accordance with some embodiments. FIG. 24 illustrates an example of cooperation between APs 502 in accordance with some embodiments. FIG. 25 illustrates example availability windows in accordance with some embodiments.

It should be noted that the examples shown in FIGS. 10-25 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 10-25. Although some of the elements shown in the examples of FIGS. 10-25 may be included in a WLAN standard, Wi-Fi standard, 802.11 standard, and/or other standard, embodiments are not limited to usage of such elements that are included in standards.

Some embodiments may be related to multi-AP group formation signaling. Some embodiments may be related to multi-AP in Extreme High Throughput (EHT) operation. 802.11 has agreed to start a new EHT group with objectives of increasing peak throughput and improving efficiency. Aspects of Multi-AP coordination may be related to one or more of: multi-AP coordination through time and frequency; multi-AP coordination through spatial domain; and/or other.

For Multi-AP coordination through spatial domain, aspects may be related to one or more of: BF and nulling, wherein each AP 502 may beamform to its associated non-AP STA 502 and may null the interference to non-AP STAs 504 in other BSSs; joint BF, wherein multiple APs 502 may jointly beamform to one non-AP STA 504; joint MU-MIMO, wherein multi-APs use transmissions included but not limited to the above; and/or other.

In some embodiments, transmission of multiple APs 502 coordinated through time and frequency domain may attempt to achieve the fractional frequency reuse concept that have been proved to work in cellular system. Further, in some cases, transmission of multiple APs coordinated through spatial domain may be viewed as a transmission from one big AP 502, which has the number of antennas equal to the total number of antennas of multiple APs 502.

In some embodiments, simultaneous transmission from multiple APs 502 may be used to achieve the gain through time, frequency, or spatial domain. In some embodiments, a technique to achieve simultaneous transmission includes transmission of an AP Trigger Frame that can be sent by one controlling AP 502 to regulate the simultaneous transmission of other coordinated APs 502. This idea may be related to the Trigger frame developed in 11ax to regulate UL transmission in a BSS. However, one difference is that for AP Trigger Frame, the solicited response may not be destined to the AP 502 that sends the AP Trigger Frame.

In some embodiments, every AP 502 may not necessarily be able to send AP Trigger Frames. Accordingly, only a portion of a plurality of APs 502 may be able to send the AP Trigger Frames, in some embodiments. In some embodiments, one or more APs 502 may determine which AP 502 and/or APs 502 may send AP Trigger Frames. This may be performed as part of a grouping procedure, although the scope of embodiments is not limited in this respect.

Some embodiments may be related to Multi-APs in WFA. Multi-AP coordination has been a hot topic in WFA, and WFA has approved a spec that will be certified. The general multi-AP network defined by WFA can be explained the non-limiting example 1000 illustrated in FIG. 10. In 1000, there are multiple multi-AP devices 1010, 1020, 1030, 1040 (labeled as multi-AP device #1-#4, respectively). In 1000, there is one Multi-AP Controller entity 1012 (in the device 1010) in the Multi-AP network 1000. Each Multi-AP device 1010, 1020, 1030, 1040 has one Multi-AP Agent (1015, 1025, 1035, 1045, respectively). Different AP in a Multi-AP network can connect through backhaul links as shown in FIG. 10.

In some embodiments, due to the existence of both wireless and wired link in a Multi-AP network, Multi-AP program may reuse and/or extend IEEE 1905.1 to do Multi-AP controller discovery. IEEE 1905.1 is a layer 2.5 protocol on top of different MAC and PHY protocols as shown in FIG. 11. To transmit 1905.1 message, 1905.1 message may be carried inside 802.11 data frames, and association may be required through backhaul link to transmit 802.11 data frame.

A non-limiting example 1200 in FIG. 12 illustrates a multi-AP network 1200 in which one or more multi-AP groups 1210 are formed. Embodiments are not limited to the number, arrangement and/or type of elements shown in FIG. 12, and are also not limited to the connectivity and/or groupings shown in FIG. 12. In some embodiments, to achieve the multi-AP coordination through time, frequency, and spatial domain, one or more multi-AP groups 1210 may be formed. In some embodiments, in each multi-AP group 1210, there may be one controlling AP 1212 and one or more other APs (including but not limited to coordinated APs 1214), although the scope of embodiments is not limited in this respect. In some embodiments, the controlling AP 1212 may coordinate coordinated APs 1214. In some embodiments, the controlling AP 1212 may reach coordinated APs 1214 through wireless medium for coordinating simultaneous transmission. Signaling exchange may be used to form the multi-AP group 1210, in some embodiments. The controlling AP 1212 and/or coordinated APs 1214 may communicate with one or more STAs 1216.

WFA defines a multi-AP network with one multi-AP controller in a Multi-AP device of the multi-AP network. However, in scenarios in which there may be multiple controlling APs 1212 and multiple Multi-AP groups 1210, existing signaling of Multi-AP network may not necessarily be able to be used to form several multi-AP groups 1210 in the Multi-AP network 1200. Some embodiments described herein address this issue.

In some embodiments, a multi-AP group 1210 may be formed, which may include one or more of the following aspects. To facilitate formation of multi-AP group 1210, advertisement of capability for forming a multi-AP group 1210 or joining a multi-AP group 1210 and be coordinated may be used. One controlling AP 1212 may initiate the multi-AP group 1210. To ensure that controlling AP 1212 can hear all other coordinated APs 1214 in the multi-AP group 1210, one or more of the following may be applicable: a negotiation procedure for an AP (such as 502 and/or the coordinated AP 1214) to join the Multi-AP group 1210 formed by the controlling AP 1212 and to be coordinated; a negotiation procedure for a controlling AP 1212 to ask another AP (such as 502 and/or the coordinated AP 1214) to join the multi-AP group 1210 formed by the controlling AP 1212; the controlling AP 1212 may assign an AP ID to each AP in the multi-AP group during negotiation. In some embodiments, one or more of the following may be applicable: a mechanism for a coordinated AP 1214 to advertise multi-AP group 1210 information (for the multi-AP group 1210 to which the coordinated AP 1214 belongs) to associated STAs 1216; a mechanism for a controlling AP 1212 to teardown a multi-AP group 1210; a mechanism for a coordinated AP 1214 to exit a multi-AP group 1210; a mechanism for a controlling AP 1212 to update multi-AP group 1210 information to coordinated AP 1214; and/or other. In some embodiments, the signaling for one or more of the above aspects may be in a 1905 format or signaling exchange may be defined in 802.11 context (including but not limited to an 802.11 management frame and/or element), to facilitate the formation of Multi-AP group 1210, although the scope of embodiments is not limited in this respect.

In some cases, signaling included in some embodiments described herein may enable formation of multiple Multi-AP groups 1210 in a Multi-AP network 1200 concept defined in WFA. In some cases, signaling developed in an 802.11 context may facilitate Multi-AP group 1210 formation and AP ID assignment without the requirement of association among APs. Some considerations are described below. In some cases, reusing 1905.1 may need association, which may take a long time, to form a link between APs before 1905.1 message can be exchanged. In some cases, Multi-AP group 1210 may need assignment of AP ID to be used in a Trigger frame (layer 2 control frame) to identify the coordinated AP 1214 in a multi-AP group 1210. Assignment of AP ID is a layer 2 behavior, which may not necessarily be done in layer 2.5, which is agnostic to layer 2 behavior. A coordinated AP 1214 in a Multi-AP group 1210 needs to advertise Multi-AP group 1210 information to associated STAs 1216 to facilitate Trigger frame operation. If the formation is done in upper layer, then the information may need to be passed down to MAC layer for advertisement, in some cases.

In some embodiments, one of more of the following terms may be used. Embodiments are not limited to this terminology. It is understood that names may be changed (for example, in a specification) but some or all of the described concepts may still be applicable. A Controlling AP 1212 may coordinate other APs (such as 502 and/or the coordinated AP 1214) for multi-AP operation including any combination of the following: coordinating simultaneous operation, coordinating certain time window for a specific defined operation, and/or other. A Multi-AP group 1210 may include one or more APs (such as 502 and/or the coordinated AP 1214) as members. Further, AP devices (such as 502 and/or the coordinated AP 1214) in the multi-AP group 1210 can participate in the Multi-AP operation coordinated by a controlling AP 1210. A coordinated AP 1214 may be in a Multi-AP group 1210 but does not operate as a controlling AP 1212.

In some embodiments, signaling related to 1905 and/or 802.11 interface may be used to form Multi-AP group 1210. However, in some cases, signaling related to an 802.11 interface may have one or more advantages.

Some embodiments may be related to initialization of a Multi-AP group 1210. For an indication to describe Multi-AP related capability, one or more of the following may be applicable: one bit may indicate support of being a controlling AP 1212 that can coordinate other APs (such as 502 and/or coordinated AP 1214) for Multi-AP operation; one bit may indicate support of being coordinated by other controlling APs 1212 to participate in Multi-AP operation; one bit may indicate support of multiple Multi-AP groups 1210; an AP with controlling AP capability can initiate a Multi-AP group 1210. It should be noted that the AP with controlling aster AP capability may be the AP 502 and/or the controlling aster AP 1212. In some embodiments, an AP may operate as a coordinated AP 1214, but it is understood that such an AP may have controlling AP capability in some embodiments. Accordingly, an AP that does not have controlling AP capability may operate as a coordinated AP 1214 in some embodiments. An AP that does have controlling AP capability may operate as a coordinated AP 1214 in some embodiments.

In some embodiments, for 1905 signaling, a TLV may include the indication. The TLV may be a new TLV, may be related to an existing TLV (such as a SupportedService TLV and/or other), and/or other. In some embodiments, for 802.11 signaling, one or more of the following may be applicable: a capability element may include the signaling; the capability element may be a capability element defined for EHT; the capability element may be included in beacon frame or any other management frame; and/or other. A non-limiting example of an element 1300 in IEEE is illustrated in FIG. 13. Embodiments are not limited to the number, size, type, name or other aspects of the fields of the element 1300 shown in FIG. 13. In some embodiments, the indication described above may be in the information field of an element (including but not limited to field 1310 of the element 1300), although the scope of embodiments is not limited in this respect.

In some embodiments, for 802.11 signaling, an element may include information of a Multi-AP group 1210, including but not limited to: MAC address of the controlling AP 1212, a Multi-AP group ID that identify the multi-AP group 1210, a list of MAC address for APs in the multi-AP group 1210, assigned AP ID for each AP in the multi-AP group 1210, and/or other. In some embodiments, an element with information of existing Multi-AP group can be carried in beacon frame or any other management frame.

Some embodiments may be related to rules in a Multi-AP group, which may include one or more of: there is only one Controlling AP 1212 that can coordinate Multi-AP operation in a multi-AP group 1210; the initiator of a Multi-AP group 1210 can be the Controlling AP 1212 of the Multi-AP group 1210; and/or other.

Some embodiments may be related to joining a Multi-AP group 1210. In some embodiments, a request/response frame to join Multi-AP group 1210 may be used. In some embodiments, for 1905 signaling, one or more additional message types for request/response under Multi-AP control message (see Table 3 of Multi-AP R1 spec) may be used. In some embodiments, for 802.11 signaling, an Action frame with request/response signaling for joining a multi-AP group 1210 may be used. In some embodiments, an Action frame may be a management frame (of format 1400 shown in FIG. 14), with action field in the frame body (format 1500 shown in FIG. 15).

In some embodiments, signaling may be used to define multi-AP action, wherein one or more of the following may be applicable: signaling can be in the category subfield or Action field right after category field; category field defines EHT action, and the Action field after category field defines multi-AP operation; category field defines Multi-AP action; and/or other. In some embodiments, signaling may be added to define request/response signaling, and one or more of the following may be applicable: signaling can be in the action field, say Multi-AP group join request and Multi-AP group join response; signaling can be in a separate element carried in the frame body of the action frame; and/or other.

In some embodiments, an AP (such as 502 and/or other) with capability support of being coordinated by a controlling AP 1212 can send the join request to an AP (such as 502 and/or other) with capability support of being a controlling AP 1212. The AP (such as 502 and/or other) that sends the request may be part of a multiple BSSID set or collocated BSSID set. In this case, the AP (such as 502 and/or other) can have indication to indicate the APs in the multiple BSSID set or collocated BSSID set that want to be included in the Multi-AP group 1210. One or more of the following may be applicable: the indication for multiple BSSID set can be multiple BSSID element; the indication can be included in the multiple BSSID element to indicate the active APs in the multiple BSSID set; the indication for collocated BSSID set can be HE operation element; the indication can be included to indicate the active APs in the collocated BSSID set.

In some embodiments, after the AP (such as 502 and/or other) with capability support of being a controlling AP 1212 receives the request, the controlling AP 1212 can send the join response to the AP (such as 502 and/or other) that sends the join request. The join response may indicate one or more of the following: accept or reject; an AP ID assigned to the AP (such as 502 and/or other) that makes the request; an AP ID assigned to each AP in the multiple BSSID set or collocated BSSID sets if indication for APs in a multiple BSSID set is included in the request; a common AP ID that identify all APs in the multiple BSSID set or collocated BSSID sets if indication for APs in a multiple BSSID set is included in the request; other information relevant for multi-AP group 1210 in the element defined for including information of multi-AP group 1210; and/or other. In some embodiments, after the AP (such as 502 and/or other) with capability support of being coordinated by a controlling AP 1212 receives the join response with accept indication, the AP that sends join request is then in the multi-AP group formed by the controlling AP 1212. If active APs in a multi-BSSID set or collocated BSSID set are included in the request, then all the active APs are in the multi-AP group 1210.

In some embodiments, an AP (such as 502 and/or other) with capability support of being a controlling AP 1212 can send the join request to an AP (such as 502 and/or other) with capability support of being coordinated by a controlling AP 1212. The join request may include one or more of the following: AP ID assigned to the AP that receives the request; AP ID assigned to all the APs in the corresponding multiple BSSID set or collocated BSSID set advertised by the AP that receives the request; a common AP ID that identifies all APs in the multiple BSSID set or collocated BSSID sets; other information relevant to Multi-AP group 1210 in the element defined for including information of multi-AP group 1210; and/or other.

In some embodiments, after the AP (such as 502 and/or other) with capability support of being coordinated by a controlling AP 1212 receives the request, the AP can send the join response to the AP that sends the join request. In some embodiments, the join response may indicate accept or reject. After the AP (such as 502 and/or other) with capability support of being a controlling AP 1212 receives the join response with accept indication, the AP that sends the join response is then in the multi-AP group 1210 formed by the controlling AP 1212. If the request includes other APs in the same multiple BSSID set or collocated BSSID set advertised by the AP that receives the request, then all the APs in the multiple BSSID set or collocated BSSID set will be in the multi-AP group 1210.

In some embodiments, if an AP (such as 502 and/or other) with capability support of being coordinated by a controlling AP 1212 is in a Multi-AP group 1210, the AP can include an element with information of an existing Multi-AP group 1210 in the beacon frame and advertise to the associated STAs 1216. The information may include one or more of the following: the assigned AP ID in a Multi-AP group 1210; MAC address of controlling AP 1212 in a multi-AP group 1210; Multi-AP group ID for a multi-AP group; one or more MAC addresses for APs in the multi-AP group 1210; assigned AP ID for each AP in the multi-AP group; assigned common AP ID for each multiple BSSID set or collocated BSSID set in the multi-AP group 1210; information for multiple multi-AP groups 1210 in which the AP is participating; and/or other.

Some embodiments may be related to a procedure of teardown or exiting a Multi-AP group 1210. In some embodiments, a tear down signaling in the action frame may be used for Multi-AP operation, wherein one or more of the following may be applicable: signaling can be in the action field, say Multi-AP group teardown; signaling can be in a separate element carried in the frame body of the action frame; and/or other. In some embodiments, exit signaling in the action frame may be used for Multi-AP operation, wherein one or more of the following may be applicable: signaling can be in the action field, say Multi-AP group exit; signaling can be in a separate element carried in the frame body of the action frame; and/or other.

In some embodiments, a controlling AP 1212 in a Multi-AP group 1210 can send individual addressed/group addressed Multi-AP tear down frame to tear down the multi-AP group 1210. In some embodiments, a controlling AP 1212 in a Multi-AP group 1210 can send individual addressed Multi-AP exit frame to a coordinated AP 1214 to ask the coordinated AP 1214 to leave the multi-AP group 1210. In some embodiments, the exit frame may indicate multiple APs in a multiple BSSID set or collocated BSSID set and ask all the APs in the multiple BSSID set or collocated BSSID set to leave the multi-AP group 1210. In some embodiments, a coordinated AP 1214 in a Multi-AP group 1210 can send Multi-AP exit frame to the Controlling AP 1212 to leave the multi-AP group 1210. In some embodiments, the exit frame may indicate multiple APs in a multiple BSSID set or collocated BSSID set and ask all the APs in the multiple BSSID set or collocated BSSID set to leave the multi-AP group 1210.

Some embodiments may be related to updating of information in a Multi-AP group 1210. In some embodiments, a controlling AP 1212 in a Multi-AP group 1210 can send individual addressed/group addressed unsolicited join response to update information of the multi-AP group 1210.

Some embodiments may be related to a procedure in which another STA sends request/response frame on behalf of other APs. A non-limiting example scenario 1600 is illustrated in FIG. 16. In this scenario 1600, the physical AP device 1610 has two APs 1614 in the multiple BSSID set and another STA 1616 acts as the interface of the physical AP 1610. In some embodiments, the STA 1616 may send request and receive response on behalf of other APs 1614 in the same physical device 1610.

In some embodiments, a procedure may be used, and the procedure may be related to the OCT concept developed in 11.33.4 On-channel Tunneling (OCT) operation. The STA 1616 may send the OCT request frame with the management frame for multi-AP joint request encapsulated in the payload of OCT request frame. The controlling AP 1612 may send the OCT response frame to the STA 1616 with the management frame for multi-AP joint response encapsulated in the payload of OCT response frame. When controlling AP 1612 initiates the request, the controlling AP 1612 may send the OCT request frame with the management frame for multi-AP joint request encapsulated in the payload of OCT request frame to the STA 1616. The STA 1616 may send the OCT response frame with the management frame for multi-AP joint response encapsulated in the payload of OCT response frame.

In some embodiments, additional request/response frame can be defined for this purpose. The STA 1616 may send the request frame with the management frame for multi-AP joint request encapsulated in the payload of the request frame. The controlling AP 1612 may send the response frame to the STA 1616 with the management frame for multi-AP joint response encapsulated in the payload of the response frame. When controlling AP 1612 initiates the request, the controlling AP 1612 may send the request frame with the management frame for multi-AP joint request encapsulated in the payload of the request frame to the STA 1616. The STA 1616 may send the response frame with the management frame for multi-AP joint response encapsulated in the payload of the response frame.

Some embodiments may be related to simultaneous synchronization to multiple TSF sources. In some embodiments, to send the AP trigger frame, a Multi-AP group 1210 may be formed with a controlling AP 1212 in the Multi-AP group 1210 that can send Trigger frame, and other coordinated APs 1214 in the group that can be coordinated by the Controlling AP 1212. In some embodiments, an AP may be in multiple multi-AP groups 1210 and can be coordinated by different controlling AP 1212.

Some embodiments may be related to multi-band data aggregation. Multi-band data aggregation may be used in EHT, in some embodiments. A non-limiting example scenario 1700 is shown in FIG. 17, wherein AP1 1710 and STA2 1720 connect through two interfaces (1730 and 1735) to enable data transmission through 2 interfaces simultaneously. In some embodiments, for enablement of this scenario, a STA 1720 may need to have association on two interfaces (such as 1730, 1735) and may need to follow the BSS timing on different interfaces.

In some embodiments, there may be a need to enable the Multi-AP coordination operation in certain time. For example, one or more of the following may be applicable: to have the trigger operation for multi-AP happen in certain time; to have EDCA parameter control in certain time; to have sounding operation in certain time; and/or other. In some embodiments, a level of time coordination may be needed for APs (such as 502 and/or other) in the Multi-AP group 1210 beyond the Trigger frame scheme. The challenge is that an AP (such as 502 and/or other) may be in multiple multi-AP groups 1210. As a result, simply synchronizing with the TSF time of different controlling APs 1212 in the one or more multi-AP groups 1210 may not necessarily work since different controlling APs 1212 may have different TSF time(s) in some cases.

In some cases, a similar problem may exist when a STA (504 and/or other) tries to connect to AP (such as 502 and/or other) through different interfaces. If the BSSs in different interfaces have different TSF value, then there is a problem for the STA (such as 504 and/or other) to follow different TSF time.

In some cases, an existing synchronization mechanism may only allow a STA (such as 504 and/or other) to synchronize to one TSF source. An existing synchronization mechanism of synchronizing directly with the TSF may not allow a STA (such as 504 and/or other) to synchronize to multiple TSF sources and follow the TSF time of different controlling APs 1212 or the TSF time of different BSSs in different interfaces, in some cases.

In some embodiments, a device, which can be an AP 502 or a STA 504, may follow multiple TSF sources and perform synchronization on multiple TSF sources simultaneously. In some embodiments, a device maintains its own TSF value. In some embodiments, a device may choose to synchronize the TSF with one of the sources, say source A, and the synchronization through beacon is performed, wherein the difference of TSF between the device and the source after synchronization may be 0. In some embodiments, a device may remember the difference of TSF value between the device and the rest of the TSF sources, wherein one or more of the following may be applicable: during synchronization, the device will synchronize the difference rather than changing the existing TSF value of itself; the difference will be updated; and/or other. In some embodiments, the source may announce the operating timing based on the TSF of itself. In some embodiments, the device may adjust the operating timing based on the recorded difference.

In some embodiments, the synchronization may be enhanced to follow multiple TSF sources. In some embodiments, a device that follows X TSF sources may only need to do one TSF count and remember X−1 values that record TSF differences if the device synchronize to one TSF source directly.

In some embodiments, one or more of the following may be used for a multi-band scenario, a multi-AP scenario and/or other scenario(s). A TSF source may be an AP 502 that starts the BSS and announces beacon with TSF information for synchronization. The device may need to be synchronized to different TSF sources. It may be assumed, in some cases, that a device needs to synchronize to X different TSF sources.

In some embodiments, recording of TSF difference may be performed. This technique may be applicable to one or more of the following scenarios (labeled as "Scenario 1" and "Scenario 2" for clarity), but it is understood that one or more of the techniques described herein may be applicable to other scenarios.

In Scenario 1, the device may directly synchronize its TSF with one of the TSF source, say source 1, and the device does not directly synchronize its TSF to other TSF sources. A non-limiting example 1800 is shown in FIG. 18, in which a TSF synchronization to X different TSF sources is performed. Embodiments are not limited by the usage of blocks (Blocks 1-3, indicated by 1810, 1820, 1830), as one or more of the techniques, operations and/or methods performed by those blocks may be performed by one or more devices, and may not necessarily be performed as part of a block.

Referring to FIG. 18, in block 1 (1810), the device may remember X−1 values, and each value may record the TSF difference of its TSF and one of the TSF sources. For instance, if the TSF of a TSF sources is TS, and the TSF of the device is TD, then the device remembers TS-TD or TD-TS.

Referring to FIG. 18, in block 2 (1820), when the device receives the TSF from a TSF source that the device does not directly synchronize to, the STA 504 may obtain the adjusted TSF value from the TSF source like today as described below. Upon receiving a Beacon, a DMG Beacon, or an Announce frame for the BSS, as described in 11.1.3.7 (Beacon reception), a STA shall update its TSF timer according to the following algorithm. For a Non-DMG STA: The received timestamp value shall be adjusted by adding an amount equal to the receiving STA's delay through its local PHY components plus the time since the first bit of the timestamp was received at the MAC, PHY interface. In the case of an infrastructure BSS, the STA's ISF timer shall then be set to the adjusted value of the timestamp. If the TSF from the source is partial, then STA 504 may obtain adjusted TSF value through additional algorithm. Now, instead of setting the own TSF value to the adjusted TSF value, say Adjusted_TS, the STA 504 may adjust the recorded TSF difference for the recorded by setting the value as the following: Adjusted_TS−TD or TD−Adjusted_TS.

Referring to FIG. 18, in block 3 (1830), when the device receives the TSF from a TSF source that the device directly synchronize to, the device may obtain the adjusted TSF value, say Adjusted_TSF, from the TSF source like today as shown below. Upon receiving a Beacon, a DMG Beacon, or an Announce frame for the BSS, as described in 11.1.3.7 (Beacon reception), a STA shall update its TSF timer according to the following algorithm. Non-DMG STA: The received timestamp value shall be adjusted by adding an amount equal to the receiving ST A's delay through its local PHY components plus the time since the first bit of the timestamp was received at the MAC/PHY interface. In the case of an infrastructure BSS, the STA s TSF timer shall then be set to the adjusted value of the timestamp. If the TSF from the source is partial, then STA 504 may obtain adjusted TSF value through additional algorithm. The device gets the TSF difference, say D, which is Adjusted_TSF−TD or TD−Adjusted_TSF. The device does the following operation for each existing recorded TSF difference for other TSF sources: Recorded TSF difference−D. The device sets its own TSF, TD, to adjusted_TSF like today.

In Scenario 2, the device does not directly synchronize its TSF to any TSF sources. A non-limiting example 1900 is shown in FIG. 19. Embodiments are not limited by the usage of blocks (Blocks 1-2, indicated by 1910, 1920), as one or more of the techniques, operations and/or methods performed by those blocks may be performed by one or more devices, and may not necessarily be performed as part of a block.

Referring to FIG. 19, in block 3 (1930), the device may remember X values, and each value may record the TSF difference of its TSF and one of the TSF sources. For instance, if the TSF of a TSF sources is TS, and the TSF of the device is TD, then the device remembers TS-TD or TD-TS.

Referring to FIG. 19, in block 2 (1920), when the device receives the TSF from a TSF source that the device does not directly synchronize to, the STA 504 may obtain the adjusted TSF value from the TSF source like today as shown below. Upon receiving a Beacon, a DMG Beacon, or an Announce frame for the BSS, as described in 11.1.3.7 (Beacon reception), a STA shall update its TSF timer according to the following algorithm. Non-DMG STA: The received timestamp value shall be adjusted by adding an amount equal to the receiving STA s delay through its local PHY components plus the time since the first bit of the timestamp was received at the MAC/PHY interface. In the case of an infrastructure BSS, the STA's TSF timer shall then be set to the adjusted value of the timestamp. If the TSF from the source is partial, then STA 504 may obtain adjusted TSF value through additional algorithm. Now, instead of setting the own TSF value to the adjusted TSF value, say Adjusted_TS, the STA 504 may adjust the recorded TSF difference for the recorded by setting the value as the following: Adjusted_TS−TD or TD−Adjusted_TS.

In some embodiments, adjusting timing based on the recorded difference may be used. Note that for Scenario 1, it may be seen that the recorded difference between the device and the TSF source that the device directly synchronizes to is 0. Each TSF source may announce timing for certain operation based on its own TSF, say TS. The device may adjust the announced timing to its own timing for certain operations in accordance with one or more of: if the recorded difference is TS-TD, then the device adjusted the timing by minus the recorded difference to the announced timing, i.e., announced timing—recorded difference; if the recorded difference is TD-TS, the device adjusted the timing by adding the recorded difference to the announced timing, i.e., announced timing+recorded difference; and/or other.

Some embodiments may be related to an availability window design for AP cooperation. Multi-AP cooperation is a promising new feature that will be adopted by the next generation wifi-802.11 extreme high throughput (EHT). To enable the AP cooperation, the AP (502 and/or other) may need to implement channel sounding with STAs (504 and/or other) belonging to OBSS, and also multiple APs (502 and/or other) may need to simultaneously transmit data to STAs (504 and/or other) belonging to OBSS. Since the AP (502 and/or other) may only know the status of the STAs (504 and/or other) within its own BSS, the STAs (504 and/or other) associating with other BSS may not be ready when the AP (502 and/or other) may send packets to these STAs (504 and/or other). We propose to define different types of availability window between AP (502 and/or other) and STAs (504 and/or other) to enable the efficient cooperation between STA (504 and/or other) and multi-AP.

In some embodiments, different types of availability windows between multiple APs (502 and/or other) and the STAs (504 and/or other) may be used. In different availability windows, the multi-AP and STAs (504 and/or other) may implement channel sounding, or data packet transmission or other services. In some cases, the availability window design may enable multi-AP to exchange frames with STAs (504 and/or other) associated with BBS or OBSS efficiently.

In some embodiments, in multi-AP cooperation, the multi-AP may transmit or receive packets from the STA (504 and/or other) simultaneously. To guarantee the efficiency of multi-AP cooperation, there may exist a controlling AP (504 and/or other) which may control the resource schedule or allocation of the subordinate APs (502 and/or other) locating in the vicinity of the controlling AP (502 and/or other). The controlling AP (502 and/or other) may define availability windows for the subordinate AP (502 and/or other) and STAs (504 and/or other). The controlling AP (502 and/or other) may first announce the availability windows to other subordinate APs (502 and/or other), then each subordinate AP (502 and/or other) that receives the announced availability window may announce the same availability window to its associated STAs (504 and/or other). In each availability window, the multi-AP may send one or more packets to the STAs (504 and/or other) or may receive one or more packets from the STAs (504 and/or other). In the following, two types of availability windows have been defined.

In some embodiments (which may be referred to for clarity as "Option 1"), in the availability window the multi-AP and STA (504 and/or other) may implement channel sounding. Each STA (504 and/or other) may associate with the subordinate AP (502 and/or other) and controlling AP (504 and/or other) may be required to be awake in the availability window to participate in channel sounding. As an alternative, subordinate AP (502 and/or other) may announce the associated STAs (504 and/or other) that are required to be awake in the availability window.

In some embodiments, the channel sounding may include uplink channel sounding or downlink channel sounding. In the uplink channel sounding, the controlling AP (502 and/or other) or subordinate AP (502 and/or other) may send a trigger frame to trigger the STA (504 and/or other) belonging to the AP's BSS, and the STA (504 and/or other) may respond with a NDP frame, and the multi-AP can estimate the channel between STA (504 and/or other) and AP (502 and/or other) based on the uplink NDP. In the downlink channel sounding, the controlling AP (502 and/or other) may send a trigger frame to trigger the subordinate AP (502 and/or other), and the subordinate AP (502 and/or other) may respond with a downlink NDP, and the STA (504 and/or other) and other subordinate APs (502 and/or other) and controlling AP (502 and/or other) may listen to the downlink NDP to estimate the channel between them and the subordinate AP (502 and/or other) sending the NDP.

FIG. 20 illustrates a non-limiting example 2000 of downlink channel sounding between multi-AP and STA (504 and/or other). In the downlink channel sounding, one or multiple APs (502 and/or other) may send NDP to the STAs (504 and/or other), and different AP's NDP can be multiplexed by P-matrix, and the controlling AP (502 and/or other) may first send a trigger frame to trigger the NDP and the trigger frame may include allocation of the P-matrix. Some or all of the STAs (502 and/or other) associating with different BSS may listen to the NDP and estimate the channel between the STA (504 and/or other) and the AP (502 and/or other).

FIG. 21 illustrates a non-limiting example 2100 of uplink channel sounding between multi-AP and STA (504 and/or other). In the uplink channel sounding, one or multiple STAs (504 and/or other) may send NDP to the APs (502 and/or other), and different STA's NDP may be multiplexed by P-matrix. The v AP (502 and/or other) may first send a trigger frame to trigger the NDP and the trigger frame may include allocation of the P-matrix. Some or all of the APs (502 and/or other) can listen to the NDP and estimate the channel between the STA (504 and/or other) and the AP (502 and/or other).

In some embodiments, following the downlink and uplink channel sounding, the APs (502 and/or other) and STAs (504 and/or other) may exchange the channel state information (CSI). This procedure may be controlled and triggered by the controlling AP (502 and/or other). For example, the controlling AP (502 and/or other) may send trigger frame to trigger the subordinate AP (502 and/or other) or STA (504 and/or other) to transmit the packet carrying CSI.

In some embodiments (which may be referred to for clarity as Option 2), in the availability window, the multi-AP and STA (504 and/or other) may exchange downlink or uplink data packets. In some embodiments, each STA (504 and/or other) may associate with the subordinate AP (502 and/or other) and controlling AP (502 and/or other) may be required to be awake in the availability window to participate in channel sounding. As an alternative, the subordinate AP (502 and/or other) may announce the associated STAs (504 and/or other) that are required to be awake in the availability window.

In some embodiments, for the data packets transmission, there exits different levels of cooperation between multi-APs. For example, each AP (502 and/or other) may transmit one or more data packets to the STAs (504 and/or other) associated with its own BSS, and the data transmission of different APs (502 and/or other) may be cooperative to reduce the interference to each other's BSS.

In FIG. 22, a non-limiting example 2200 of cooperative data transmission between multi-APs is illustrated.

Another example of multi-AP cooperation is related to joint beamforming. The multi-APs can jointly design the beamforming for the data transmission to one or more STAs (504 and/or other). In FIG. 23, a non-limiting example 2300 of joint beamforming in multi-AP cooperation is illustrated.

In some embodiments, in the availability window, in addition to the downlink data transmission, the one or more STAs (504 and/or other) may send uplink data to multi-APs to improve power efficiency or throughput. A non-limiting example 2400 of uplink data transmission to multi-AP is shown in FIG. 24. After multi-APs receive the data packets, the multi-APs may combine the data packets received by different APs (502 and/or other) to achieve diversity gain.

A non-limiting example 2500 of the schedule of availability window is shown in FIG. 25. The subordinate AP (502 and/or other) and STAs (504 and/or other) and controlling AP (502 and/or other) may negotiate the schedule of availability window. In the negotiation, the subordinate AP (502 and/or other) may send their preferred availability window to controlling AP (502 and/or other) through some data packet. The associated STAs (504 and/or other) may send their preferred availability window to associated AP (502 and/or other) and based on the controlling AP's resource allocation, the controlling AP (502 and/or other) may determine the negotiated availability window. As described above, the negotiated availability window may be broadcasted by the controlling AP (502 and/or other) to the subordinate AP (502 and/or other) and STAs (504 and/or other). If needed, the subordinate AP (502 and/or other) may broadcast the negotiated availability window to its associated STAs (504 and/or other). Further, as mentioned before, to participate the multi-AP cooperation, the subordinate APs (502 and/or other) and STAs (504 and/or other) may need to be active during the availability window to receive or send packets. The packets transmission may be controlled by the controlling AP (502 and/or other).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The invention claimed is:

1. An apparatus for an access point (AP) station, the apparatus comprising: processing circuitry; and memory,
   the processing circuitry to configure the AP station to operate as part of a multi-AP group that includes the AP station and one or more affiliated AP stations,
   wherein when operating as part of the multi-AP group, the processing circuitry is to configure the AP station to:
   advertise the multi-AP group by encoding capability information for transmission in a beacon frame, the capability information comprising capabilities of the one or more affiliated AP stations;
   exchange frames to set up multiple links between the multi-AP group and a multi-station (STA) group, the multi-STA group comprising more than one affiliated non-AP STA;
   obtain a transmission opportunity (TXOP) for transmission of a trigger frame on one of the multiple links;
   transmit the trigger frame (TF) during the TXOP to solicit PPDUs for simultaneous transmission by more than one of the STAs of the multi-STA group, the TF used to simultaneous trigger transmission of the PPDUs on more than one of the multiple links during the TXOP; and
   refrain from transmission of a frame during the TXOP based on expected interference at one of the non-AP STAs of the multi-STA group, wherein the trigger frame is configured to allocate resources for transmission of the PPDUs on the multiple links, and wherein the multiple links are established on orthogonal channel resources assigned to each AP of the multi-AP group.

2. The apparatus of claim 1, wherein each of the multiple links is established on a different non-overlapping channel.

3. The apparatus of claim 2, wherein each of the solicited PPDUs is triggered over one of the multiple links.

4. The apparatus of claim 3, wherein the processing circuitry is to further configure the AP station to advertise link information of the multiple links.

5. The apparatus of claim 4, wherein at least some of the multiple links are configured for simultaneous transmit and receive operation.

6. The apparatus of claim 5, wherein at least some of the multiple links are configured for non-simultaneous transmit and receive operation.

7. The apparatus of claim 6, wherein the TF is encoded to indicate downlink resources to be used by one or more of the APs of the multi-AP group for downlink transmissions during the TXOP.

8. The apparatus of claim 6, wherein the multi-AP group is configured to operate as a multi-link device, the multi-link device being a logical entity.

9. The apparatus of claim 6, wherein the processing circuitry is to configure the multi-AP group to operate as a logical entity using a single MAC address.

10. The apparatus of claim 6, wherein the memory is configured to store the capability information, and wherein the processing circuitry comprises a baseband processor.

11. A non-transitory computer-readable storage medium that stores instructions for execution by processing circuitry of an access point (AP) station, the processing circuitry to configure the AP station to operate as part of a multi-AP group that includes the AP station and one or more affiliated AP stations, wherein when operating as part of the multi-AP group, the processing circuitry is to configure the AP station to:

advertise the multi-AP group by encoding capability information for transmission in a beacon frame, the capability information comprising capabilities of the one or more affiliated AP stations;

exchange frames to set up multiple links between the multi-AP group and a multi-station (STA) group, the multi-STA group comprising more than one affiliated non-AP STA;

obtain a transmission opportunity (TXOP) for transmission of a trigger frame on one of the multiple links;

transmit the trigger frame (TF) during the TXOP to solicit PPDUs for simultaneous transmission by more than one of the STAs of the multi-STA group, the TF used to simultaneous trigger transmission of the PPDUs on more than one of the multiple links during the TXOP; and refrain from transmission of a frame during the TXOP based on expected interference at one of the non-AP STAs of the multi-STA group, wherein the trigger frame is configured to allocate resources for transmission of the PPDUs on the multiple links, and wherein the multiple links are established on orthogonal channel resources assigned to each AP of the multi-AP group.

12. The non-transitory computer-readable storage medium of claim 11, wherein each of the multiple links is established on a different non-overlapping channel.

13. The non-transitory computer-readable storage medium of claim 12, wherein each of the solicited PPDUs is triggered over one of the multiple links.

14. The non-transitory computer-readable storage medium of claim 13, wherein the processing circuitry is to further configure the AP station to advertise link information of the multiple links.

15. The non-transitory computer-readable storage medium of claim 14, wherein at least some of the multiple links are configured for simultaneous transmit and receive operation.

16. The non-transitory computer-readable storage medium of claim 15, wherein at least some of the multiple links are configured for non-simultaneous transmit and receive operation.

17. The non-transitory computer-readable storage medium of claim 16, wherein the TF is encoded to indicate downlink resources to be used by one or more of the APs of the multi-AP group for downlink transmissions during the TXOP.

18. The non-transitory computer-readable storage medium of claim 16, wherein the multi-AP group is configured to operate as a multi-link device, the multi-link device being a logical entity.

19. The non-transitory computer-readable storage medium of claim 16, wherein the processing circuitry is to configure the multi-AP group to operate as a logical entity using a single MAC address.

20. A method performed by processing circuitry of an access point (AP) station, the processing circuitry to configure the AP station to operate as part of a multi-AP group that includes the AP station and one or more affiliated AP stations, wherein when operating as part of the multi-AP group, the method comprises configuring the AP station to:

advertise the multi-AP group by encoding capability information for transmission in a beacon frame, the capability information comprising capabilities of the one or more affiliated AP stations;

exchange frames to set up multiple links between the multi-AP group and a multi-station (STA) group, the multi-STA group comprising more than one affiliated non-AP STA;

obtain a transmission opportunity (TXOP) for transmission of a trigger frame on one of the multiple links;

transmit the trigger frame (TF) during the TXOP to solicit PPDUs for simultaneous transmission by more than one of the STAs of the multi-STA group, the TF used to simultaneous trigger transmission of the PPDUs on more than one of the multiple links during the TXOP; and refrain from transmission of a frame during the TXOP based on expected interference at one of the non-AP STAs of the multi-STA group, wherein the trigger frame is configured to allocate resources for transmission of the PPDUs on the multiple links, and wherein the multiple links are established on orthogonal channel resources assigned to each AP of the multi-AP group.

21. The method of claim 20, further comprising:

establishing each of the multiple links on a different non-overlapping channel;

triggering each of the solicited PPDUs over one of the multiple links; and
advertising link information of the multiple links.

* * * * *